United States Patent
Gass et al.

(10) Patent No.: US 9,292,180 B2
(45) Date of Patent: Mar. 22, 2016

(54) LOCATOR SYSTEM FOR THREE-DIMENSIONAL VISUALIZATION

(71) Applicant: The Boeing Company, Chicago, IL (US)

(72) Inventors: John Carney Gass, Sammamish, WA (US); James J. Troy, Issaquah, WA (US); William E. Ward, Issaquah, WA (US); Christopher Esposito, Issaquah, WA (US); Kevin Puterbaugh, Auburn, WA (US); Nikoli E. Prazak, Renton, WA (US); Bruce L. Nelson, Woodinville, WA (US); William D. McGarry, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 82 days.

(21) Appl. No.: 13/855,102

(22) Filed: Apr. 2, 2013

(65) Prior Publication Data
US 2014/0298227 A1  Oct. 2, 2014

(51) Int. Cl.
*G06F 3/0484* (2013.01)
*G06Q 50/04* (2012.01)

(52) U.S. Cl.
CPC ............ *G06F 3/0484* (2013.01); *G06Q 50/04* (2013.01); *Y02T 10/82* (2013.01)

(58) Field of Classification Search
CPC ............ G06F 3/04815; G06F 3/0482; G06F 17/30991
USPC .................................................. 345/619, 633
See application file for complete search history.

(56) References Cited

U.S. PATENT DOCUMENTS

| | | | |
|---|---|---|---|
| 3,744,917 A | 7/1973 | Craig | |
| 5,023,805 A | 6/1991 | Aune | |
| 5,367,552 A | 11/1994 | Peschmann | |
| 5,544,558 A | 8/1996 | Hughes | |
| 5,771,043 A | 6/1998 | Nigawara et al. | |
| 5,822,218 A | 10/1998 | Moosa et al. | |
| 5,960,104 A | 9/1999 | Conners | |
| 6,000,610 A | 12/1999 | Talbott et al. | |
| 6,167,394 A | 12/2000 | Leung | |
| 6,240,328 B1 | 5/2001 | LaLonde et al. | |
| 6,378,387 B1 | 4/2002 | Froom | |
| 6,418,189 B1 | 7/2002 | Schafer | |

(Continued)

FOREIGN PATENT DOCUMENTS

| | | | |
|---|---|---|---|
| EP | 1321869 A2 | 6/2003 | |
| EP | 2431915 A2 | 3/2012 | |

(Continued)

OTHER PUBLICATIONS

Senesac, "Serial Number Control Visualization System," U.S. Appl. No. 14/467,706, filed Aug. 25, 2014, 113.

(Continued)

*Primary Examiner* — Ke Xiao
*Assistant Examiner* — Kim-Thanh T Tran
(74) *Attorney, Agent, or Firm* — Yee & Associates, P.C.

(57) ABSTRACT

A method and apparatus for locating a part in an aircraft. A part is identified in the aircraft. A series of views is generated from a model of the aircraft with graphical indicators in the series of views configured to provide guidance to a position of the part in the aircraft. The series of views is displayed on a display device.

22 Claims, 22 Drawing Sheets

(56) References Cited

U.S. PATENT DOCUMENTS

| | | | |
|---|---|---|---|
| 6,477,471 B1 | 11/2002 | Hedstrom et al. | |
| 6,481,096 B2 | 11/2002 | Lehmker | |
| 6,487,479 B1 | 11/2002 | Nelson | |
| 6,597,761 B1 | 7/2003 | Garms, III | |
| 6,604,681 B1 | 8/2003 | Burke | |
| 6,637,266 B1 | 10/2003 | Froom | |
| 6,912,507 B1 | 6/2005 | Phillips | |
| 6,941,204 B2 | 9/2005 | Halm | |
| 7,042,346 B2 | 5/2006 | Paulsen | |
| 7,103,434 B2 | 9/2006 | Chernyak | |
| 7,302,443 B2 | 11/2007 | Nakajima et al. | |
| 7,333,991 B2 | 2/2008 | Hill et al. | |
| 7,343,213 B1 | 3/2008 | Burgess | |
| 7,353,192 B1 | 4/2008 | Ellis et al. | |
| 7,365,747 B2 | 4/2008 | Finlayson et al. | |
| 7,366,688 B2 | 4/2008 | Kwasniewski et al. | |
| 7,646,384 B2 | 1/2010 | Anderson et al. | |
| 7,933,441 B2 | 4/2011 | Numata | |
| 7,954,070 B2 | 5/2011 | Plocher | |
| 8,027,745 B1 | 9/2011 | Freeze | |
| 8,051,547 B2 | 11/2011 | Toh | |
| 8,079,130 B2 | 12/2011 | Hardouin-Finez | |
| 8,116,529 B2 | 2/2012 | Edwards | |
| 8,352,904 B2 | 1/2013 | Hodges | |
| 8,527,348 B2 | 9/2013 | Petrov | |
| 8,571,951 B2 | 10/2013 | Diana et al. | |
| 8,620,627 B2 | 12/2013 | Nakhle et al. | |
| 8,791,823 B2 | 7/2014 | Xu | |
| 8,849,636 B2 | 9/2014 | Becker | |
| 8,860,760 B2 | 10/2014 | Chen | |
| 8,914,149 B2 | 12/2014 | Safa-Bakhsh et al. | |
| 2002/0007225 A1 | 1/2002 | Costello et al. | |
| 2002/0071524 A1 | 6/2002 | Renkart | |
| 2002/0168083 A1 | 11/2002 | Garms | |
| 2002/0198764 A1 | 12/2002 | Schorno | |
| 2003/0055812 A1 | 3/2003 | Williams et al. | |
| 2003/0083794 A1 | 5/2003 | Halm | |
| 2003/0120472 A1 | 6/2003 | Lind | |
| 2003/0158702 A1 | 8/2003 | Busche et al. | |
| 2004/0068350 A1* | 4/2004 | Tomson | 701/1 |
| 2004/0093100 A1 | 5/2004 | Gleis | |
| 2004/0098151 A1 | 5/2004 | Carlucci et al. | |
| 2004/0162651 A1 | 8/2004 | Halm | |
| 2005/0044011 A1 | 2/2005 | Deal | |
| 2005/0228708 A1 | 10/2005 | Catala et al. | |
| 2005/0278062 A1 | 12/2005 | Janert et al. | |
| 2006/0106682 A1 | 5/2006 | Van Dyck et al. | |
| 2006/0119601 A1* | 6/2006 | Finlayson et al. | 345/427 |
| 2007/0219645 A1 | 9/2007 | Thomas et al. | |
| 2008/0140270 A1 | 6/2008 | Davis et al. | |
| 2008/0187897 A1 | 8/2008 | Franzen et al. | |
| 2008/0205763 A1 | 8/2008 | Marsh et al. | |
| 2008/0209342 A1 | 8/2008 | Taylor | |
| 2008/0234850 A1 | 9/2008 | Bowling et al. | |
| 2008/0294395 A1 | 11/2008 | Lu | |
| 2008/0301012 A1 | 12/2008 | Cogswell et al. | |
| 2009/0013281 A1 | 1/2009 | Helfman et al. | |
| 2009/0138230 A1 | 5/2009 | Davies et al. | |
| 2009/0144962 A1 | 6/2009 | Hardouin-Finez | |
| 2009/0192644 A1 | 7/2009 | Meyer et al. | |
| 2009/0228133 A1 | 9/2009 | Loda | |
| 2009/0312897 A1 | 12/2009 | Jamrosz et al. | |
| 2010/0010794 A1 | 1/2010 | Sweers | |
| 2010/0042952 A1* | 2/2010 | Geesey | 715/851 |
| 2010/0125468 A1 | 5/2010 | Avery et al. | |
| 2010/0161095 A1 | 6/2010 | Lindgren | |
| 2010/0175013 A1 | 7/2010 | Krauter et al. | |
| 2010/0299304 A1 | 11/2010 | Vasudevan | |
| 2011/0022208 A1 | 1/2011 | Bouffiou et al. | |
| 2011/0041088 A1 | 2/2011 | Mason et al. | |
| 2011/0046763 A1 | 2/2011 | Tsuchiya et al. | |
| 2011/0087466 A1 | 4/2011 | Vossmann | |
| 2011/0087513 A1 | 4/2011 | Floyd et al. | |
| 2011/0137443 A1 | 6/2011 | Farahani | |
| 2011/0169924 A1 | 7/2011 | Haisty et al. | |
| 2011/0172795 A1 | 7/2011 | Hansen et al. | |
| 2011/0251711 A1 | 10/2011 | Goel | |
| 2011/0288840 A1 | 11/2011 | Kropinski et al. | |
| 2012/0007852 A1 | 1/2012 | Morate et al. | |
| 2012/0030926 A1 | 2/2012 | Toh et al. | |
| 2012/0071998 A1 | 3/2012 | Davies et al. | |
| 2012/0075343 A1* | 3/2012 | Chen et al. | 345/633 |
| 2012/0100520 A1 | 4/2012 | Jo et al. | |
| 2012/0130521 A1 | 5/2012 | Kohlhoff | |
| 2012/0249588 A1 | 10/2012 | Tison et al. | |
| 2012/0303336 A1 | 11/2012 | Becker et al. | |
| 2012/0304059 A1 | 11/2012 | McCloskey | |
| 2012/0306666 A1* | 12/2012 | Xu et al. | 340/945 |
| 2013/0006409 A1 | 1/2013 | Evans et al. | |
| 2013/0124150 A1 | 5/2013 | Kim et al. | |
| 2013/0132373 A1 | 5/2013 | Huang et al. | |
| 2013/0261876 A1 | 10/2013 | Froom | |
| 2014/0013263 A1 | 1/2014 | Bailiang | |
| 2014/0089030 A1 | 3/2014 | Bell | |
| 2015/0134274 A1 | 5/2015 | Froom | |

FOREIGN PATENT DOCUMENTS

| | | |
|---|---|---|
| EP | 2458562 A1 | 5/2012 |
| EP | 2790136 A1 | 10/2014 |
| GB | 2327289 A | 1/1999 |
| JP | 2007095039 A | 4/2007 |
| WO | WO0049544 A2 | 8/2000 |
| WO | WO2011056196 A1 | 5/2011 |
| WO | WO2012166545 A2 | 12/2012 |
| WO | WO2013078156 A1 | 5/2013 |
| WO | WO2013078265 A1 | 5/2013 |

OTHER PUBLICATIONS

Extended European Search Report, dated Jul. 17, 2014, regarding Application No. 14162481.7, 5 pages.
Extended European Search Report, dated Jul. 23, 2014, regarding Application No. 14157597.7, 7 pages.
Extended European Search Report, dated Aug. 22, 2014, regarding Application No. EP14159832.6, 9 pages.
International Search Report and Written Opinion, dated Apr. 25, 2014, regarding Application No. PCT/US2014/010912, 10 pages.
Extended European Search Report, dated Jun. 2, 2014, regarding Application No. 14160787.9, 6 pages.
"Notice from the European Patent Office dated Oct. 1, 2007 concerning business methods," Official Journal EPO, Nov. 2007, pp. 592-593.
Senesac et al., "Condition of Assembly Visualization System Based on Build Cycles," U.S. Appl. No. 13/835,262, filed Mar. 15, 2013, 79 pages.
Senesac et al., "Shop Order Status Visualization System," U.S. Appl. No. 13/785,616, filed Mar. 5, 2013, 98 pages.
Senesac, "Condition of Assembly Visualization System," U.S. Appl. No. 13/834,893, filed Mar. 15, 2013, 73 pages.
Senesac, "Nonconformance Visualization System," U.S. Appl. No. 13/798,964, filed Mar. 13, 2013, 84 pages.
Senesac, "Object Visualization System," U.S. Appl. No. 13/780,109, filed Feb. 28, 2013, 61 pages.
Senesac, "Shop Order Status Visualization System," U.S. Appl. No. 13/858,364, filed Apr. 8, 2013, 108 pages.
Senesac et al., "Aircraft Comparison System," U.S. Appl. No. 13/860,126, filed Apr. 10, 2013, 103 pages.
Senesac et al., "Nonconformance Visualization System," U.S. Appl. No. 13/861,678, filed Apr. 12, 2013, 116 pages.
Senesac, "Shop Order Status Visualization System," U.S. Appl. No. 13/890,347, filed May 9, 2013, 96 pages.
Prazak et al., "Visualization of an Object Using a Visual Query System," U.S. Appl. No. 13/852,063, filed Mar. 28, 2013, 50 pages.
Senesac et al., "Aircraft Comparison System with Synchronized Displays," U.S. Appl. No. 13/922,411, filed Jun. 20, 2013, 120 pages.
Extended European Search Report, dated Sep. 30, 2014, regarding Application No. EP14159760.9, 6 pages.
International Search Report and Written Opinion, dated Nov. 19, 2014, regarding Application No. PCT/US2014/011196, 10 pages.

(56) References Cited

OTHER PUBLICATIONS

International Search Report and Written Opinion, dated Dec. 1, 2014, regarding Application No. PCT/US2014/031030, 9 pages.
Extended European Search Report, dated Dec. 3, 2014, regarding Application No. 14170988.1, 7 pages.
Office Action, dated Dec. 17, 2014, regarding U.S. Appl. No. 13/780,109, 37 pages.
Final Office Action, dated Mar. 27, 2015, regarding U.S. Appl. No. 13/780,109, 18 pages.
Non-Patent Literature including images from the website www.aso.com, as published on Jan. 16, 2013 based on captures in the Internet Archive tool referred to as the WayBackMachine, http://web.archive.org/web/20130116040904/http://www.aso.com/ ("NPL1"), in Final Office Action dated Mar. 27, 2015, 3 pages.
"What's New in SolidWorks," SolidWorks, Version 2010, 199 pages. http://files.solidworks.com/Supportfiles/Whats_new/2010/English/whatsnew.pdf.
"Marianna Airmotive Uses a FARO Laser Tracker to Reduce Repair Turnaround Time dramatically," Mar. 7, 2015, 2 pages. http://www.mariannaairmotive.com.
Office Action, dated Feb. 26, 2015, regarding U.S. Appl. No. 13/858,364, 32 pages.
Notice of Allowance, dated Apr. 13, 2015, regarding U.S. Appl. No. 13/858,364, 5 pages.
Office Action, dated Feb. 27, 2015, regarding U.S. Appl. No. 13/834,893, 41 pages.
Office Action, dated May 6, 2015, regarding U.S. Appl. No. 13/852,063, 39 pages.
Office Action, dated Apr. 23, 2015, regarding U.S. Appl. No. 13/798,964, 39 pages.
Office Action, dated May 5, 2015, regarding U.S. Appl. No. 13/861,678, 48 pages.
Notice of Allowance, dated Jun. 22, 2015, regarding U.S. Appl. No. 13/834,893, 24 pages.
Office Action, dated Jun. 29 2015, regarding U.S. Appl. No. 13/922,411, 43 pages.
Australian Government Patent Examination Report No. 2, dated Jul. 8, 2015, regarding Application No. 2014200514, 3 pages.
Australian Government Patent Examination Report No. 3, dated Aug. 13, 2015, regarding Application No. 2014200514, 4 pages.
Australian Government Patent Examination Report No. 2, dated Jul. 30, 2015, regarding Application No. 2014200292, 5 pages.
International Preliminary Report on Patentability, dated Sep. 1, 2015, regarding Application No. PCT/US2014/010912, 6 pages.
Office Action, dated Sep. 17, 2015, regarding U.S. Appl. No. 13/780,109, 47 pages.
Office Action, dated Jul. 24 2015, regarding U.S. Appl. No. 13/785,616, 55 pages.
Office Action, dated Sep. 21, 2015, regarding U.S. Appl. No. 13/835,262, 41 pages.
Office Action, dated Aug. 14, 2015, regarding U.S. Appl. No. 13/890,347, 44 pages.
Final Office Action, dated Sep. 4, 2015, regarding U.S. Appl. No. 13/861,678, 27 pages.
Office Action, dated Sep. 29 2015, regarding U.S. Appl. No. 13/860,126, 34 pages.
Final Office Action, dated Jul. 31 2015, regarding U.S. Appl. No. 13/922,411, 23 pages.
Final Office Action, dated Oct. 22, 2015, regarding U.S. Appl. No. 13/852,063, 30 pages.
Notices of Reasons for Rejection and English Translation, issued Sep. 8, 2015, regarding Japanese Patent Application No. 2014-060864, 5 pages.
Kokogawa et al., "Wide-Area Contents Distribution based on Cooperation among Digital Libraries," Information Processing Academic Society Research Report, Mar. 10, 2000, vol. 2000, No. 26, pp. 83-88.
Extended European Search Report, dated Nov. 18, 2015, regarding Application No. EP14159752.6, 6 pages.
Final Office Action, dated Nov. 20, 2015, regarding U.S. Appl. No. 13/890,347, 38 pages.

\* cited by examiner

FIG. 21
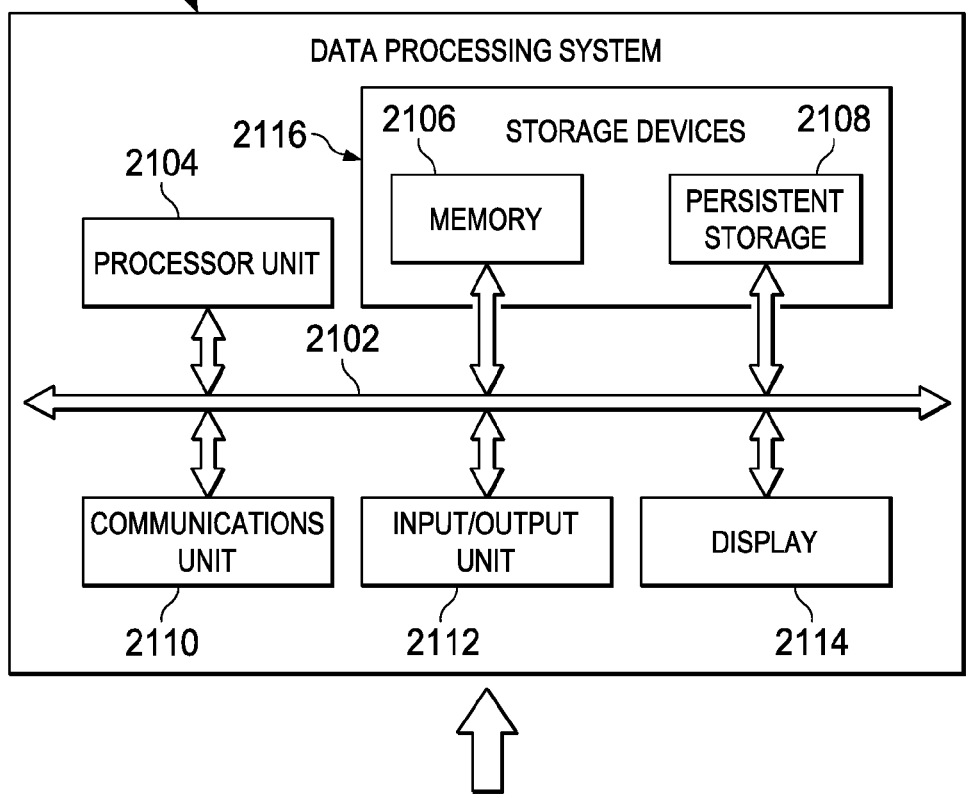
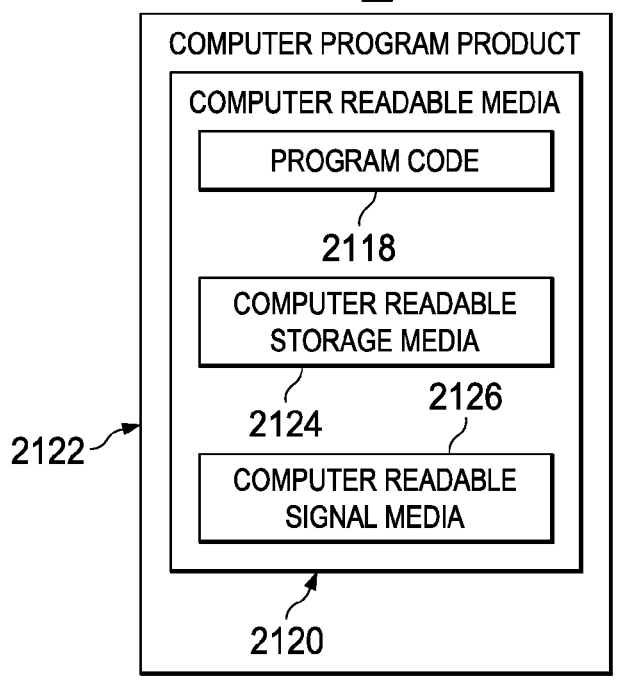

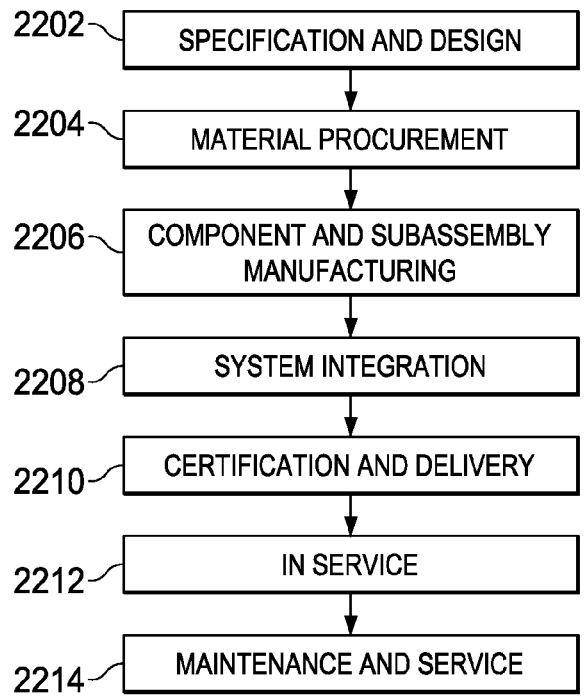
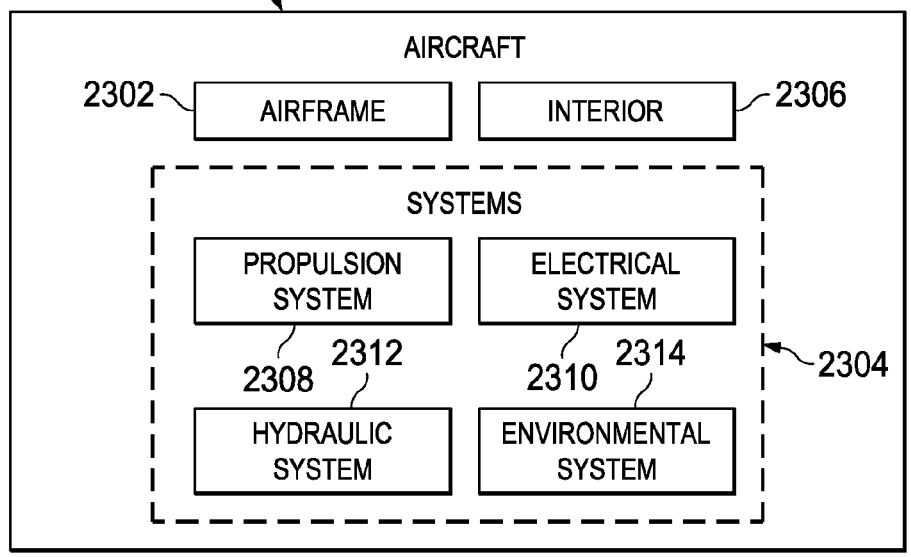

LOCATOR SYSTEM FOR THREE-DIMENSIONAL VISUALIZATION

CROSS-REFERENCE TO RELATED APPLICATIONS

This application is related to the following patent applications: entitled "Object Visualization System," Ser. No. 13/780,109, filed Feb. 28, 2013, "Shop Order Status Visualization System," Ser. No. 13/785,616, filed Mar. 5, 2013, "Nonconformance Visualization System," Ser. No. 13/798,964, filed Mar. 13, 2013, "Condition of Assembly Visualization System," Ser. No. 13/834,893, filed Mar. 15, 2013, "Condition of Assembly Visualization System Based on Build Cycles," Ser. No. 13/835,262, filed Mar. 15, 2013, "Shop Order Status Visualization System," Ser. No. 13/858,364, filed Apr. 8, 2013, "Aircraft Comparison System," Ser. No. 13/860,126, filed Apr. 10, 2013,"Nonconformance Visualization System," Ser. No. 13/861,678, filed Apr. 12, 2013, "Shop Order Status Visualization System," Ser. No. 13/890,347, filed May 9, 2013, and "Aircraft Comparison System with Synchronized Displays," Ser. No. 13/922,411, filed Jun. 20, 2013, each assigned to the same assignee, and each incorporated herein by reference.

BACKGROUND INFORMATION

1. Field

The present disclosure relates generally to manufacturing and, in particular, to manufacturing of vehicles. Still more particularly, the present disclosure relates to a method and apparatus for assembling vehicles in a manufacturing environment.

2. Background

The assembly of an aircraft is an extremely complex process. Hundreds of thousands of parts may be assembled for an aircraft.

The assembly of an aircraft may involve manufacturing different parts of the aircraft in geographically diverse locations. These different parts may then be finally assembled in a single location. For example, different portions of a fuselage of a composite aircraft may be assembled in different locations and flown to a central location where the final assembly line is located. Additionally, other parts such as engines, auxiliary power units, seats, computer systems, line replaceable units, or other components of the aircraft may be shipped to this final location for assembly to form the assembled aircraft.

The assembly of the different parts involves assigning tasks to different operators. The assignment of these tasks may take the form of shop order instances. Each shop order instance may include instructions and an identification of parts for a particular assembly in the aircraft.

Shop floor operators may have a need to identify positions of parts on the aircraft in order to follow assembly instructions described in shop order instances. These positions are ones relative to the particular aircraft being assembled and are defined with respect to a reference coordinate system, such as airplane coordinates. In some cases, both the position and the orientation are needed. In other cases, only the position may be required. Further, "location," as used herein, is the position and may also include the orientation, or angular rotation, of the part. Currently, operators assigned a task to assemble a part for the aircraft may look at paper copies of the blueprints of the aircraft to determine where to perform tasks to install or assemble parts for the aircraft. These paper copies may provide some guidance to an operator, but often times they may be difficult to understand and may not include sufficient information.

In some cases, the operator may view a computer-aided design model of the aircraft using a computer-aided design software system. These types of systems, however, require training and experience to maneuver through the model of the aircraft.

For example, an operator of the computer-aided design software system often uses aircraft coordinates to identify locations in, on, or near the aircraft. Aircraft coordinates have an origin relative to some location in, on, or near the aircraft. Further, when traversing through the model, positions may be defined using aircraft Cartesian coordinates. Of course, any suitable coordinate system may be used. Additionally, orientations may be defined using angular rotations, such as $\alpha$, $\beta$, and $\gamma$ rotations. These aircraft coordinates, however, are often not helpful to an operator that is assigned a task in a work instruction description called a shop order instance. The aircraft coordinates may need to be translated into action locations for the operator. Additionally, the model does not provide the operator an idea of what parts may or may not be already installed in the aircraft for performing a particular task.

As a result, operators may take more time than needed, may need additional training, or both to view locations in the aircraft where tasks in a shop order instance are to be performed. This additional time or training may increase the time or expense needed to assemble an aircraft.

With respect to positions of parts, a similar issue is present with respect to maintenance. For example, an operator may need to locate a particular part in an aircraft for inspection, replacement, or other types of maintenance. Finding the position of this part in an aircraft may be challenging, depending on experience and training of the operator. As a result, the time and expense needed to perform maintenance on an aircraft may be greater than desired.

Therefore, it would be desirable to have a method and apparatus that take into account at least some of the issues discussed above, as well as other possible issues.

SUMMARY

In one illustrative embodiment, an apparatus comprises an object manager configured to identify a part in an aircraft. The object manager is further configured to generate a series of views from a model of the aircraft with graphical indicators in the series of views configured to provide guidance to a position of the part in the aircraft. The object manage is further configured to display the series of views on a display device.

In another illustrative embodiment, an apparatus comprises an object manager configured to identify a part in an object. The object manager is further configured to generate a series of views from a model of the object with graphical indicators in the series of views configured to provide guidance to a position of the part in the object. The object manager is further configured to display the series of views on a display device.

In yet another illustrative embodiment, a method for locating a part in an aircraft is present. A part is identified in the aircraft. A series of views is generated from a model of the aircraft with graphical indicators in the series of views configured to provide guidance to a position of the part in the aircraft. The series of views is displayed on a display device.

In still yet another illustrative embodiment, an aircraft management system comprises a control system and an object manager in the control system. The control system is configured to control manufacturing of an aircraft. The object manager is configured to identify a part in the aircraft. The object manager is further configured to generate a series of views from a model of the aircraft with graphical indicators in the series of views configured to provide guidance to a position of the part in the aircraft. The object manager is further configured to display the series of views on a display device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 21 is an illustration of a block diagram of a data processing system in accordance with an illustrative embodiment;

FIG. 22 is an illustration of a block diagram of an aircraft manufacturing and service method in accordance with an illustrative embodiment;

FIG. 23 is an illustration of a block diagram of an aircraft in which an illustrative embodiment may be implemented.

DETAILED DESCRIPTION

The illustrative embodiments recognize and take into account one or more different considerations. For example, the illustrative embodiments recognize and take into account that in performing tasks, operators may look at a visualization of the aircraft. For example, an operator may view a model of an aircraft.

Illustrative examples recognize and take into account that identifying a part in the three-dimensional model of the aircraft may be more difficult than desired. Further, when the part is identified in the model of aircraft, reaching the position of the part in the aircraft may be more difficult than desired from viewing the model of the aircraft.

Thus, the illustrative embodiments provide a method and apparatus for locating a part in an aircraft. In one illustrative example, a part in the aircraft is identified. A series of views are generated from a model of the aircraft with graphical indicators in the series of views configured to provide guidance to reach a position of the part in the aircraft. The series of views may then be displayed on a display device.

Figure 1:
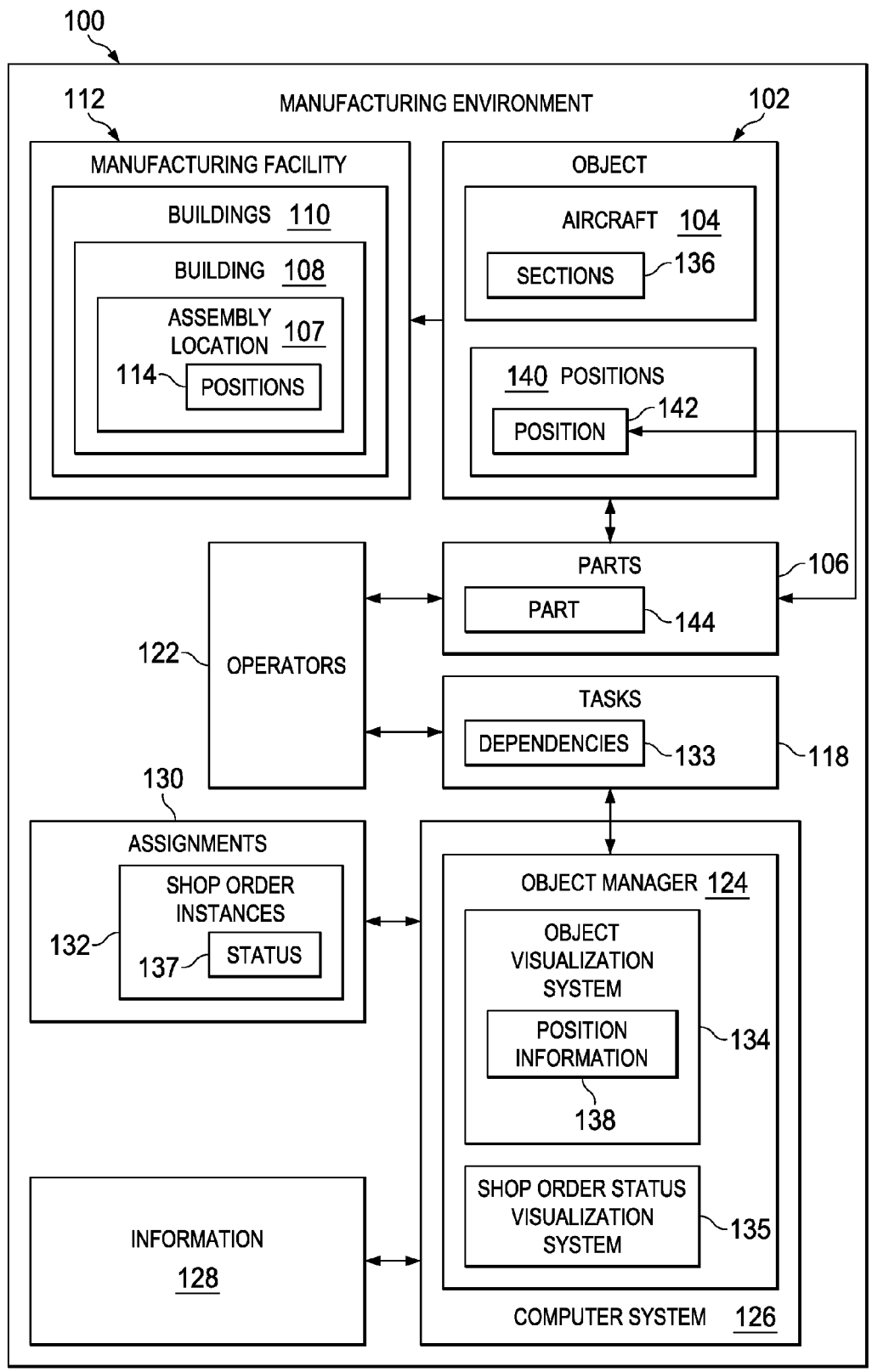
FIG. 1 is an illustration of a block diagram of a manufacturing environment in accordance with an illustrative embodiment.

With reference now to the figures, and in particular, with reference to FIG. 1, an illustration of a block diagram of a manufacturing environment is depicted in accordance with an illustrative embodiment. Manufacturing environment 100 is an example of an environment in which object 102 may be assembled.

In this illustrative example, object 102 takes the form of aircraft 104. Object 102 is completed by assembling parts 106. A part is a group of components. As used herein, a "group of," when used with reference items, means one or more items. For example, a group of components is one or more components.

A part may be a single component or assembly of components in these depicted examples. For example, the part may be a seat, a row of seats, an in-flight entertainment system, a duct, a system of ducts, a global positioning system receiver, an engine, an engine housing, an inlet, or other suitable types of parts.

In this illustrative example, assembling parts 106 may take place in assembly location 107 in building 108 of buildings 110 at manufacturing facility 112. The assembly of parts 106 in building 108 may occur in positions 114 in assembly location 107 for object 102. Each position in positions 114 is a location in building 108 in which a group of tasks 118 is performed to assemble object 102.

In these illustrative examples, a task is a piece of work. A task may be comprised of one or more operations that are performed by a group of operators 122 assigned to work on the assembly of object 102.

In the illustrative examples, object manager 124 may be used to manage the assembly of object 102. When object 102 is aircraft 104, object manager 124 may be part of an aircraft management system. Object manager 124 may be implemented in software, hardware, firmware, or a combination thereof. When software is used, the operations performed by object manager 124 may be implemented in program code configured to run on a processor unit. When firmware is used, the operations performed by object manager 124 may be implemented in program code and data and stored in persistent memory to run on a processor unit. When hardware is employed, the hardware may include circuits that operate to perform the operations in object manager 124.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, or other suitable hardware devices. Additionally, the processes may be implemented in organic components integrated with inorganic components and/or may be comprised entirely of organic components excluding a human being. For example, the processes may be implemented as circuits in organic semiconductors.

As depicted, object manager 124 may be implemented in computer system 126. Computer system 126 is one or more computers. When more than one computer is present, the computers in computer system 126 may communicate with each other using a communications medium such as a network. Computer system 126 may be located all in the same location or in different geographic locations. For example, computer system 126 may be distributed through buildings 110 or located in building 108. Portions of computer system 126 may even be located in another geographic location separate from manufacturing facility 112.

In managing the assembly of object 102, object manager 124 may manage tasks 118 and information 128 about object 102. In the illustrative example, the management of tasks 118 may include at least one of assigning tasks 118 to operators 122, monitoring the status of tasks 118, organizing tasks 118, providing information about tasks 118, or other suitable operations. Information 128 may include, for example, the models of objects, part inventories, or other suitable information relating to object 102.

As used herein, the phrase "at least one of," when used with a list of items, means different combinations of one or more of the listed items may be used and only one of each item in the list may be needed. For example, "at least one of item A, item B, or item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In these illustrative examples, object manager 124 may manage tasks 118 using assignments 130 in the form of shop order instances 132. For example, object manager 124 may assign tasks through the use of shop order instances 132 to operators 122 for performance and assembling of object 102. Additionally, the status of shop order instances 132 may be used to identify the state of assembly of object 102 by operators 122.

Additionally, tasks 118 may have dependencies 133. In other words, tasks 118 may be performed in a particular order. Dependencies 133 may dictate when tasks within tasks 118 should be performed relative to other tasks in tasks 118. Dependencies may also be for parts 106 in addition to or in place of tasks 118. In this form, dependencies 133 may result in dependencies 133 for tasks 118.

As a result, dependencies 133 may affect the manner in which assignments 130 are made as shop order instances 132. In particular, dependencies 133 may be used to determine when shop order instances 132 should be performed.

In these illustrative examples, object manager 124 may provide different functions and capabilities for assembling object 102. For example, object manager 124 may include at least one of object visualization system 134, shop order status visualization system 135, or other types of systems. The systems may be implemented using hardware, software, or some combination thereof.

In one illustrative example, object visualization system 134 may provide a visualization of object 102 to operators 122. In particular, operators 122 may perform queries using object visualization system 134 to view a number of sections 136 in object 102. In particular, sections 136 may be sections that correspond to sections at manufacturing facility 112 for assembly of object 102, such as aircraft 104.

In these illustrative examples, the manufacturing may include at least one of fabricating components for parts, assembling components to form parts, assembling parts for object 102, or some other suitable manufacturing operation performed to assemble object 102.

For example, object manager 124 may provide visual information about all of object 102 or one or more specific sections of object 102. This type of visualization may be especially useful when object 102 takes the form of aircraft 104. Information 128 may be used when operators 122 perform tasks 118 with respect to parts 106 to assemble aircraft 104.

In another illustrative example, shop order status visualization system 135 may provide a visualization of status 137 of shop order instances 132. This information may be provided visually to operators 122.

Additionally, object visualization system 134 may generate position information 138. Position information 138 may be used by operators 122 to reach positions 140 in aircraft 104. In particular, position information 138 may provide operators 122 guidance to reach positions 140 in aircraft 104 to perform tasks 118 for shop order instances 132. In other words, position information 138 may allow operators 122 to physically travel to positions 140 in aircraft 104.

In this illustrative example, a location, which includes a position and an orientation, of a part is a description of where the part can be found. For example, a position of a part may be described using X and Y coordinates, X, Y, and Z coordinates, or some other suitable coordinate system. An orientation of the part may be described by angular rotations about the X, Y, and Z axes of a suitable coordinate system. In some examples, only the position of the part may be relevant. In other examples, both position and orientation may be needed.

In the illustrative examples, this guidance is provided in a visual manner from position information 138 generated by object visualization system 134. As depicted, positions 140 are physical positions in aircraft 104 where parts 106 are located, where parts 106 should be installed, or some combination thereof.

For example, object visualization system 134 may provide visual information that guides operators 122 to position 142 in positions 140 to inspect part 144 in parts 106 at the location. In another example, position 142 may be a position in which part 144 is to be installed in aircraft 104. Further, object manager 124 also may provide other suitable functions in managing the assembly of object 102.

Figure 2:
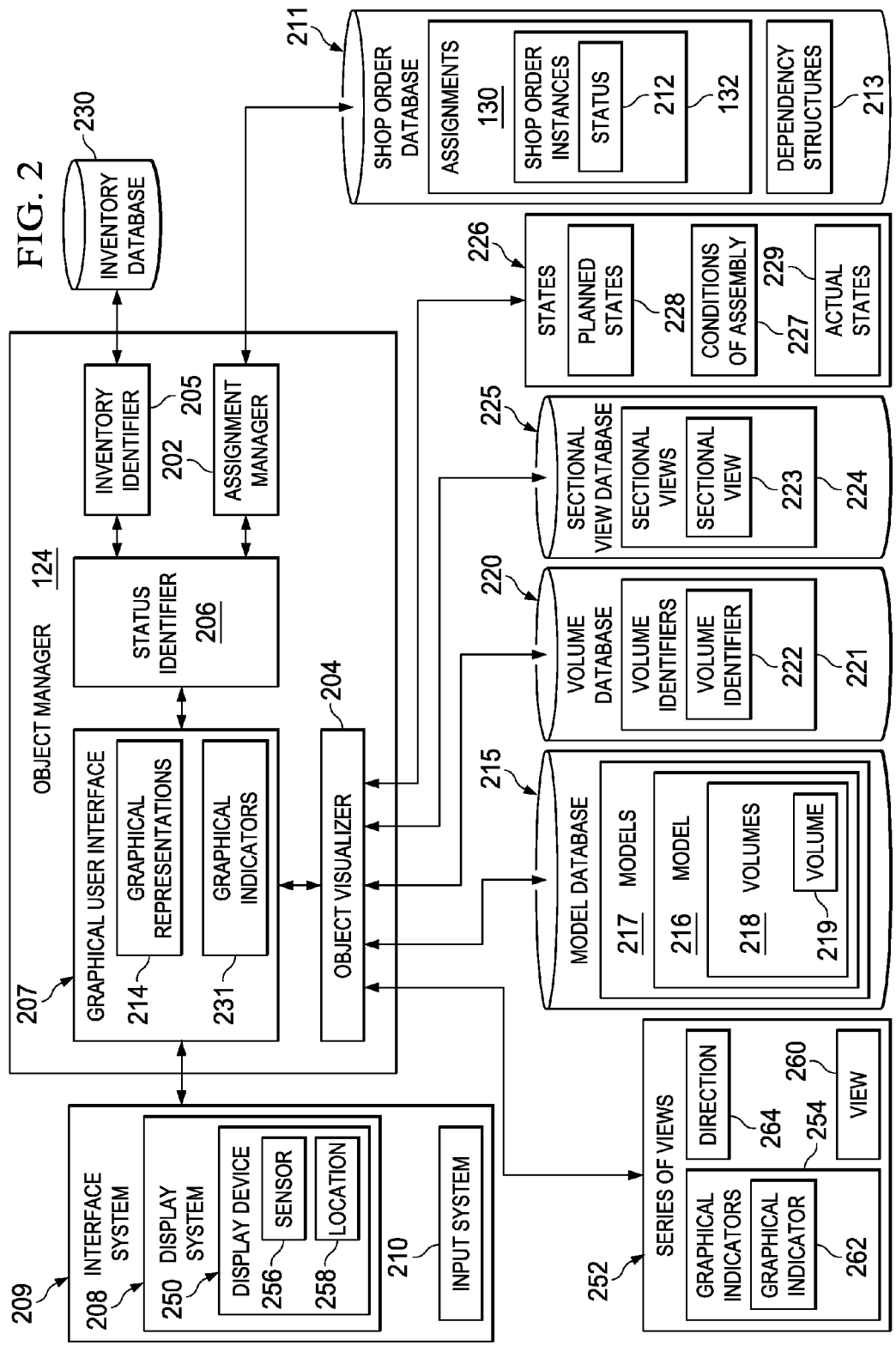
FIG. 2 is an illustration of a block diagram of an object manager in accordance with an illustrative embodiment.

Turning now to FIG. 2, an illustration of a block diagram of an object manager is depicted in accordance with an illustrative embodiment. Examples of components that may be implemented in object manager 124 are shown in this figure.

As depicted, object manager 124 includes a number of different components. For example, object manager 124 includes assignment manager 202, object visualizer 204, inventory identifier 205, status identifier 206, and graphical user interface 207. These different components in object manager 124 may be implemented using hardware, software, or some combination thereof. As used herein, a "number of," when used with reference to items, means one or more items. For example, a number of different components means one or more different components.

Graphical user interface 207 is configured to provide an interface for operators 122 to interact with object manager 124. In these illustrative examples, graphical user interface 207 may be displayed on display system 208 in interface system 209.

Display system 208 is hardware and may include one or more display devices selected from at least one of a liquid crystal display (LCD), a light emitting display (LED), an organic light emitting display (OLED), or other suitable types of display devices.

As depicted, display system 208 includes display device 250. Display device 250 may take various forms. For example, display device 250 may be selected from one of a tablet computer, a laptop computer, a mobile phone, and other suitable types of devices that may display graphical user interface 207. In some illustrative examples, display system 208 may include more than one display device. Further, the display device may be merely a monitor rather than an entire data processing or computer system.

Input may be received from operators 122 through input system 210 in interface system 209. In this illustrative example, input system 210 is a hardware system. Input system 210 may include one or more devices. These devices may include at least one of a keyboard, a mouse, a joystick, a touch screen panel, or other suitable types of devices.

In this illustrative example, assignment manager 202 is configured to manage assignments 130 in the form of shop order instances 132 in shop order database 211. For example, assignment manager 202 may be used to assign tasks 118 to operators 122 using shop order instances 132. Additionally, assignment manager 202 also may be configured to receive information about the performance of tasks 118 assigned through shop order instances 132. This information may be used by assignment manager 202 to generate and update status 212 for shop order instances 132.

Additionally, shop order database 211 also may include dependency structures 213. Dependency structures 213 may be used to describe dependencies 133 between at least one of parts 106 and tasks 118. For example, a first part may need to be installed before a second part is installed. As another example, a first task for installing a part may need to be performed prior to a second task for inspecting the installation of the part. Dependency structures 213 describe these relationships between at least one of parts 106 or tasks 118 for assembling object 102.

Object visualizer 204 is configured to generate graphical representations 214 for parts 106. Graphical representations 214 may be displayed on graphical user interface 207 in display system 208. As depicted, object visualizer 204 is configured to access model database 215. Object visualizer 204 may identify model 216 from models 217 in model database 215 for object 102 and, in particular, for aircraft 104. Model 216 is used to generate graphical representations 214 in this illustrative example. In these illustrative examples, model 216 may be optimized for increasing the speed at which graphical representations 214 may be generated. In other words, model 216 may not be uniform such that model 216 may be easily used for making design changes. Information for those features may be removed or arranged to increase the speed at which graphical representations 214 may be generated.

In these illustrative examples, graphical representations 214 may be generated for sections 136 of object 102, which may take the form of aircraft 104. In this illustrative example, model 216 may be identified for object 102 from models 217 in model database 215. Models 217 may take various forms. For example, without limitation, models 217 may include computer-aided design (CAD) files.

Each model in models 217 may be for a particular object. These objects may be of the same type but used for different instances. For example, models 217 may be for a particular type of aircraft but may be used for a different instance. Each model may be for a particular aircraft that is being assembled for a customer. Further, the different models may be for the same aircraft model but may have variations for different options selected by a customer. In other illustrative examples, models 217 may include models for different types of aircraft 104.

The generation of graphical representations 214 may be based on all of model 216 or a group of volumes 218 in model 216. These items may have different shapes. For example, volume 219 in volumes 218 may be a cube, a cuboid, a cylinder, a sphere, or some other suitable shape.

In these illustrative examples, volume 219 is for at least a portion of a part in parts 106 of object 102. Volume 219 may be large enough to encompass the part. Volume 219 may also be larger than the part. In these illustrative examples, volume 219 may comprise an amount of space around the part for viewing the part in a graphical user interface. For example, the amount of space around the part may be for viewing the part in the graphical user interface from one or more angles. In this example, the one or more angles may be one or more angles from the point of view of an operator. In this example, the point of view of the operator may be of an operator performing a task associated with the part.

As depicted, the group of volumes 218 may be identified in model 216 using volume database 220. Volume database 220 is a collection of information that may be used to identify which volumes in volumes 218 may be displayed as graphical representations 214. In particular, the collection of information may include volume identifiers 221. For example, volume identifier 222 in volume identifiers 221 may define volume 219 in volumes 218.

In these illustrative examples, an identification of volume 219 may be made using sectional view 223 from sectional views 224 in sectional view database 225. Sectional views 224 may include sectional views of the different objects. For example, sectional view 223 may correspond to model 216.

An operator may select the group of volumes 218 using sectional view 223 displayed on graphical user interface 207 in this particular example.

As depicted, sectional views 224 in sectional view database 225 may provide views of sections 136 for object 102. In the illustrative examples, sections 136 correspond to sections as manufactured for assembly of object 102. In particular, sections 136 may correspond to sections as manufactured for assembly of aircraft 104.

Further, sectional views 224 may include different levels of detail. For example, sectional views 224 may include a hierarchy of levels in which the lower levels have more detail about aircraft 104 than higher levels in the hierarchy. In some illustrative examples, a selection of a sectional view in sectional views 224 may result in another sectional view being displayed. In other illustrative examples, a selection made in a sectional view may result in graphical representations 214 being generated from model 216 and displayed on graphical user interface 207. In this manner, an operator may visually query aircraft 104 through the different sectional views in sectional views 224.

As a result, operator interaction generating user input with sectional view 223 displayed in graphical user interface 207 may be used to identify volumes 218 in model 216. The user input may be used to identify volume identifier 222 from volume identifiers 221. Volume identifier 222 may point to volume 219 in model 216.

In these illustrative examples, object visualizer 204 may generate queries using volume identifiers 221 to obtain information from model 216 in model database 215. In particular, information may be data about volume 219 in model 216 for aircraft 104.

As depicted, object visualizer 204 also may be configured to generate graphical representations 214 for states 226 of object 102. In these illustrative examples, states 226 may be used for object 102 in the form of aircraft 104. In other words, aircraft 104 may have different parts in parts 106 that are installed at different states within states 226. In the illustrative examples, states 226 may take the form of conditions of assembly 227 for object 102.

For example, states 226 may be based on positions 114 of aircraft 104 within assembly location 107 in building 108. In these illustrative examples, states 226 may be selected from at least one of planned states 228 or actual states 229.

Aircraft 104 may have different planned states in planned states 228 in different positions in positions 114 in assembly location 107. In this illustrative example, a planned state in planned states 228 includes the parts that are expected to be installed at a particular position in positions 114. In other words, these parts may or may not have been installed at that position for aircraft 104.

In these illustrative examples, the planned state may be based on the past position, current position, or the future position of aircraft 104 in positions 114. In other words, graphical representations 214 may be generated for any position that is present for planned states 228 for aircraft 104.

As depicted, an actual state in actual states 229 includes parts 106 that have actually been installed in aircraft 104. In other words, a particular state may have a selected number of parts that are installed at that state. The actual state in actual states 229 may be based on at least one of a past position or the current position of aircraft 104. In other words, graphical representations 214 may be generated for parts 106 actually installed at a prior point in time. This prior point in time may be selected by an operator. In this manner, an operator may view tasks 118 performed to install parts 106 at some prior point in time.

Additionally, the actual state may be the current state of aircraft 104. In other words, graphical representations 214 may be generated for parts 106 that have been installed at the current point in time. In this manner, graphical representations 214 may be used to visualize parts 106 that are currently present in aircraft 104.

In these illustrative examples, the identification of parts that have already been installed or parts installed in prior points in time may be identified using shop order instances 132. In particular, shop order instances 132 may indicate whether or what parts in parts 106 have been installed.

Model database 215 is a database of models for objects. In these illustrative examples, these models may be, for example, computer-aided design models (CAD). Of course, any type of model that may provide information about the three-dimensional geometries of objects may be used. Additionally, these models may also include other information about materials, instruction assemblies, or other suitable types of information.

As depicted, inventory identifier 205 is configured to access inventory database 230. Inventory database 230 contains information about parts. Inventory database 230 may include information about whether parts are in stock, when parts will be delivered, the number of parts available, or other suitable types of information.

As depicted, status identifier 206 is configured to provide a visualization of the status for one or more of shop order instances 132. In this illustrative example, status identifier 206 is configured to provide an operator a graphical front end through graphical user interface 207 to identify the status of a shop order instance in a specific location of object 102, such as aircraft 104. This information may be identified without the operator knowing the coordinates of the particular location.

In these illustrative examples, object visualizer 204 is configured to identify a model of object 102, such as aircraft 104. For example, object visualizer 204 may identify the model in model database 215 for object 102.

Status identifier 206 is also configured to identify shop order instances 132 for object 102. The identification may be made through interaction with assignment manager 202.

In the illustrative example, status identifier 206 is also configured to identify status 212 of shop order instances 132. This identification also may be made through assignment manager 202.

Object visualizer 204 is configured to display graphical representations 214 of parts 106 in FIG. 1 for a group of shop order instances 132 in graphical user interface 207 on display device 250 in display system 208. The generation of graphical representations 214 may be based on the identification of a group of shop order instances 132. In other words, object visualizer 204 is configured to receive an identification of parts in the group of shop order instances 132. The identification of these parts may be used to generate graphical representations 214.

Further, status identifier 206 is also configured to display a set of graphical indicators 231 in association with graphical representations 214 of parts 106 displayed on graphical user interface 207 by object visualizer 204. As used herein, a "set of," when used with reference items, means one or more items. For example, a set of graphical indicators 231 is one or more of graphical indicators 231.

In these illustrative examples, a graphical indicator in graphical indicators 231 is considered to be displayed in association with a graphical representation in graphical representations 214 when the attention of an operator viewing graphical indicators 231 is drawn to the parts. Thus, the graphical indicator may be displayed as part of the graphical representation, on the graphical representation, in some proximity of the graphical representation, or in some other suitable manner that draws attention to the graphical representation.

The set of graphical indicators 231 displayed in association with graphical representations 214 of parts 106 may take different forms. For example, the set of graphical indicators 231 may be selected from at least one of a color, cross hatching, an icon, highlighting, animation, or other suitable types of graphical indicators.

Further, the group of shop order instances 132 may be identified in a number of different ways. For example, the group of shop order instances 132 may be identified by a user input to graphical user interface 207 from an operator. For example, the user input received may be a selection of the group of shop order instances 132.

In another illustrative example, the identification of the group of shop order instances 132 may be identified from a user input selecting a group of parts 106 in object 102 in FIG. 1. The selection of the group of parts 106 may be one of a selection of the group of parts 106 from a list of parts 106 and a selection of the group of parts 106 from a display of graphical representations 214 of parts 106 in graphical user interface 207.

Additionally, status identifier 206 may display information about a shop order instance for a part selected from graphical representations 214 of parts 106 displayed in graphical user interface 207.

With this information in graphical user interface 207, real-world operations may be performed. For example, the assembly of object 102 in FIG. 1 may be managed based on graphical representations 214 of parts 106 for shop order instances 132 and the set of graphical indicators 231 displayed on graphical user interface 207. For example, identifications of operations that should be performed may be made using this visualization. These operations may include when particular parts should be assembled, when inspections of parts assembled in object 102 should be made, or other suitable types of operations.

In these illustrative examples, object manager 124 also may be configured to display position information 138 in graphical user interface 207 on display device 250. Position information 138 is used to reach part 144 in position 142 in aircraft 104 in this illustrative example.

As depicted, object visualizer 204 in object manager 124 identifies part 144 in aircraft 104. In the illustrative example, part 144 may be identified in a number of different ways. For example, part 144 may be identified from a part identifier for part 144. In another illustrative example, part 144 may be identified using coordinates for part 144. In still other illustrative examples, part 144 may be identified from a selection of part 144 from a visual display of model 216 as well as using other suitable techniques.

Series of views 252 is generated by object visualizer 204 from model 216 of aircraft 104. Series of views 252 includes graphical indicators 254. Graphical indicators 254 in series of views 252 are configured to provide guidance to position 142 of part 144 in aircraft 104. Series of views 252 may be displayed on graphical user interface 207 on display device 250 in display system 208.

In the illustrative examples, a view in series of views 252 provides a more detailed view of part 144 in a prior view in series of views 252. In other words, series of views 252 may be in a sequence that provides further detail in identifying position 142 of part 144 in aircraft 104. As depicted, view 260 in series of views 252 may be a more magnified view or "zoomed in view" view as compared to a prior view in the sequence for position 142 for part 144. Graphical indicators 254 in series of views 252 are configured to draw attention to position 142 for part 144.

Further, series of views 252 may include all of parts 106 that may be assembled for aircraft 104. In some illustrative examples, series of views 252 may include part 144 that is present for a particular state in states 226. In other words, series of views 252 may include parts 106 based on a particular condition of assembly in conditions of assembly 227 for aircraft 104. As described above, the identification of parts 106 present in aircraft 104 for a particular state in states 226 may be identified using shop order instances 132.

Further, in some illustrative examples, display device 250 may include sensor 256. Sensor 256 is configured to identify location 258 of display device 250 relative to aircraft 104. In this illustrative example, location 258 may be a position of display device 250 and an orientation of display device 250. Of course, in some illustrative examples, the position of display device 250 may be identified without the orientation of display device 250.

In these illustrative examples, sensor 256 may take various forms. For example, sensor 256 may be an inertial measurement unit, an accelerometer system, a global positioning system receiver, or other suitable devices. Further, sensor 256 may include more than one device or type of device depending on the particular implementation.

The location of display device 250 relative to aircraft 104 as described herein may be aircraft 104 in a partially assembled form. In other illustrative examples, aircraft 104 may be in a fully assembled form.

With this configuration, display device 250 may be configured to be operated by an operator in operators 122 to locate part 144 in aircraft 104. In particular, an operator may carry display device 250 while looking for position 142 of part 144. Series of views 252 may be displayed in graphical user interface 207 on display device 250 in a manner that guides the operator towards position 142 of part 144.

This type of guidance may be an interactive guidance. For example, the guidance may use virtual-reality, augmented reality, or some other simpler type of display to guide the operator to position 142 of part 144 while displaying series of views 252.

As depicted, location 258 includes a position of display device 250 in two or more dimensions and an orientation of display device 250. The position of display device 250 may be based on aircraft coordinates for aircraft 104.

In this illustrative example, view 260 in series of views 252 may be displayed on display device 250. View 260 may be a view of volume 219 in model 216 of aircraft 104. View 260 of volume 219 in model 216 of aircraft 104 corresponds to location 258 of display device 250.

As depicted, view 260 of volume 219 in model 216 of aircraft 104 corresponds to location 258 of display device 250 with graphical indicator 262 in graphical indicators 254 associated with the display of part 144 when part 144 is in view 260 displayed in graphical user interface 207 on display device 250. The display of view 260 of volume 219 in model 216 with graphical indicator 262 indicating direction 264 to position 142 of part 144 when part 144 is absent from view 260 displayed in graphical user interface 207 on display device 250.

The display of series of views 252 may be used to perform various tasks in tasks 118. This display may be used to perform at least one of assembly or maintenance of aircraft 104 using series of views 252. In this manner, the time and expense needed to perform tasks 118 in assembling aircraft 104 may be reduced.

In FIG. 2, different components are illustrated as being located in object manager 124. These different components may be used as part of different systems. The systems may include at least one of object visualization system 134, shop order status visualization system 135, or other suitable systems. A component in object manager 124 may be used in more than one system. For example, object visualizer 204 may be in both object visualization system 134 and shop order status visualization system 135. In other words, the different components illustrated in object manager 124 may be used at the same time by different systems in object manager 124.

Figure 3:
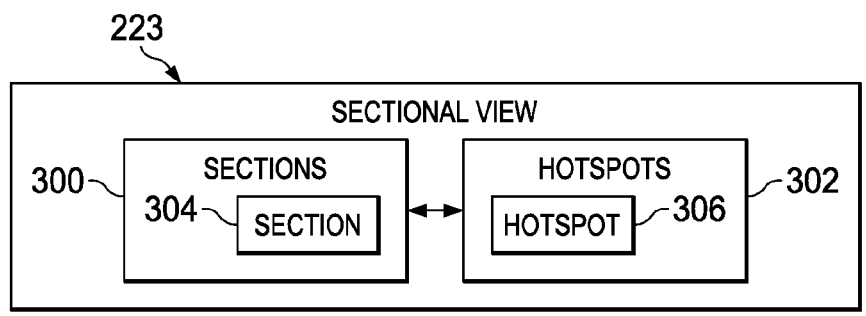
FIG. 3 is an illustration of a block diagram of a sectional view in accordance with an illustrative embodiment.

Turning now to FIG. 3, an illustration of a block diagram of a sectional view is depicted in accordance with an illustrative embodiment. An example of one implementation for sectional view 223 in FIG. 2 is shown.

As depicted, sectional view 223 includes a number of different pieces of information. For example, sectional view 223 includes sections 300 and hotspots 302.

Sections 300 are graphical representations corresponding to sections 136 for object 102 and, in particular, aircraft 104 in FIG. 1. In these illustrative examples, sections 300 may be located in a single image, multiple images, or some other suitable form. Graphical representations are in an exploded view in this illustrative example. Further, sections 300 are graphical representations corresponding to sections 136 manufactured for assembly of aircraft 104.

In these illustrative examples, sections 300 may be selectable. A selection of section 304 in sections 300 having hotspot 306 results in a volume corresponding to section 304 in model 216 being displayed in this illustrative example. Hotspot 306 may be a pointer to volume identifier 222 associated with volume 219. For example, hotspot 306 may include a universal resource locator, or some other suitable addressing convention to identify volume identifier 222 from volume identifiers 221 in volume database 220.

Figure 4:
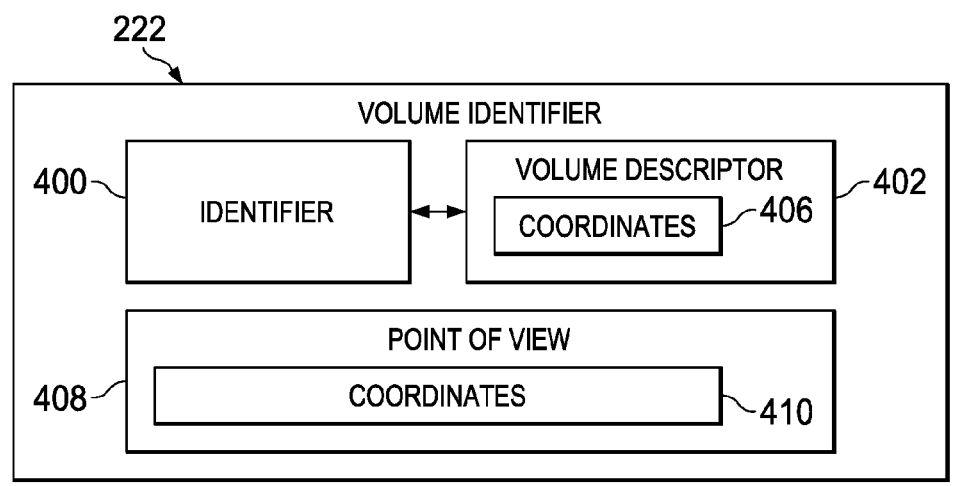
FIG. 4 is an illustration of a block diagram of a volume identifier in accordance with an illustrative embodiment.

Turning now to FIG. 4, an illustration of a block diagram of a volume identifier is depicted in accordance with an illustrative embodiment. In this illustrative example, one implementation for volume identifier 222 in FIG. 2 is shown.

Volume identifier 222 includes a number of components. As depicted, volume identifier 222 includes identifier 400 and volume descriptor 402.

Identifier 400 distinguishes volume identifier 222 from others of volume identifiers 221 that may be present in volume database 220. Identifier 400 may take various forms. For example, identifier 400 may be a word, a phrase, a number, an alphanumeric string, or some other suitable form.

Volume descriptor 402 describes the volume in model 216. For example, volume descriptor 402 may take the form of coordinates 406. Coordinates 406 are in the coordinate system used by model 216 in this example. For example, coordinates 406 may be three coordinates that may be used to define a polygon, a cube, or a cuboid. Of course, other information may be present in volume descriptor 402 other than coordinates 406. For example, volume descriptor 402 may include a single coordinate and a radius used to define volume 219 in the form of a sphere. In still other illustrative examples, a single coordinate may be present with pre-selected offsets that define volume 219 as a cube or some other shape.

In some illustrative examples, the volume identifier may also include point of view 408. Point of view 408 may define the view of the volume displayed to an operator when graphical representations 214 are displayed on graphical user interface. For example, point of view 408 may include coordinates 410 of the point of view using the coordinate system for the volume.

Figure 5:
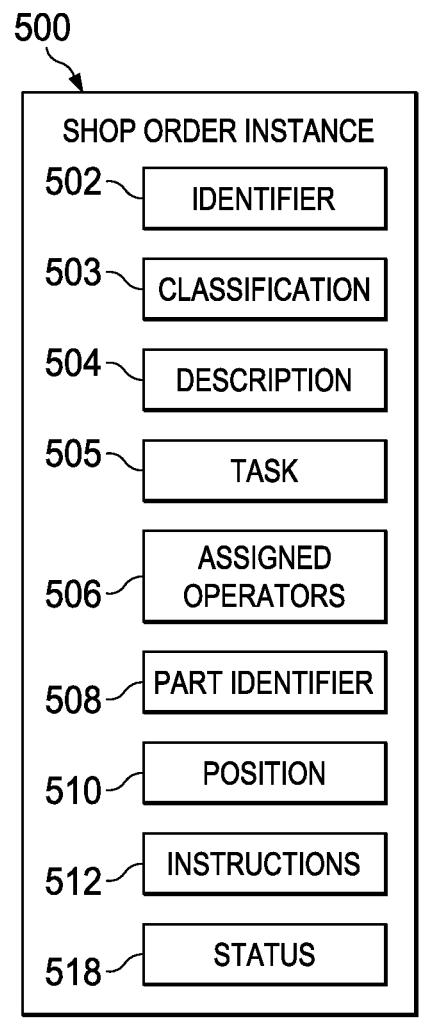
FIG. 5 is an illustration of a block diagram of a shop order instance in accordance with an illustrative embodiment.

With reference now to FIG. 5, an illustration of a block diagram of a shop order instance is depicted in accordance with an illustrative embodiment. As depicted, shop order instance 500 is an example of a shop order instance from shop order instances 132 in FIG. 1.

As depicted, shop order instance 500 may include a number of different parts. Shop order instance 500 includes identifier 502, classification 503, description 504, task 505, assigned operators 506, part identifier 508, position 510, instructions 512, and status 518.

As depicted, identifier 502 may be used to uniquely identify a task in tasks 118 in FIG. 1. Identifier 502 may be an alphanumeric identifier, a number, or some other suitable type of identifier.

In the illustrative example, classification 503 is used to classify the shop order instance. This classification may be based on the type of task to be performed. For example, the classifications may include seat installation, wiring, line replaceable unit installation, or other suitable types of classifications. The classification may be descriptive or may take the form of an identifier or other type of code.

Description 504 provides a description of task 505. This description may be a short description to provide the operator information about task 505. The description may be several words or sentences in some illustrative examples.

Task 505 identifies the work to be performed. For example, task 505 may be to install a part, assemble parts, perform an inspection, or some other suitable piece of work.

Assigned operators 506 identify a group of operators that may be assigned to perform task 505. In some cases, an operator may not yet be assigned to perform task 505 for shop order instance 500.

In this illustrative example, part identifier 508 identifies a part assembled in object 102 using shop order instance 500. In this illustrative example, part identifier 508 is a part number for the part. For example, part identifier 508 may be a serial number, a combination of a serial number and vendor identifier, or some other suitable type of identification that uniquely identifies a particular part from other parts even if those parts are the same type.

In the illustrative examples, part identifier 508 may be used to generate the graphical representation of the parts identified. For example, part identifier 508 may be used to locate the information in a model needed to generate the graphical representation of the part for display.

Position 510 identifies the position where task 505 is to be performed. This position may be in coordinates for object 102 or some other coordinate system.

Instructions 512 are a group of instructions for performing task 505. In particular, the group of instructions may be for assembling a group of parts. These instructions may be step-by-step instructions, guidance, or other suitable types of instructions. These instructions may provide guidance for assembling parts, inspecting parts, or other suitable operations that may be performed for task 505. Instructions 512 also may include plans for the position in which task 505 is to be performed.

As depicted, status 518 provides information about the performance of task 505 for shop order instance 500. In this illustrative example, the status may indicate that work is to be performed, has been completed, is in progress, is unassigned, has been planned, is on hold, is ready, has been canceled, or some other suitable status for shop order instance 500. The status may be indicated using text, codes, symbols, or other suitable mechanisms. Additionally, if status 518 indicates that the work to be performed has been completed, status 518 also may include a date and time of when work for performing task 505 occurred.

Figure 6:
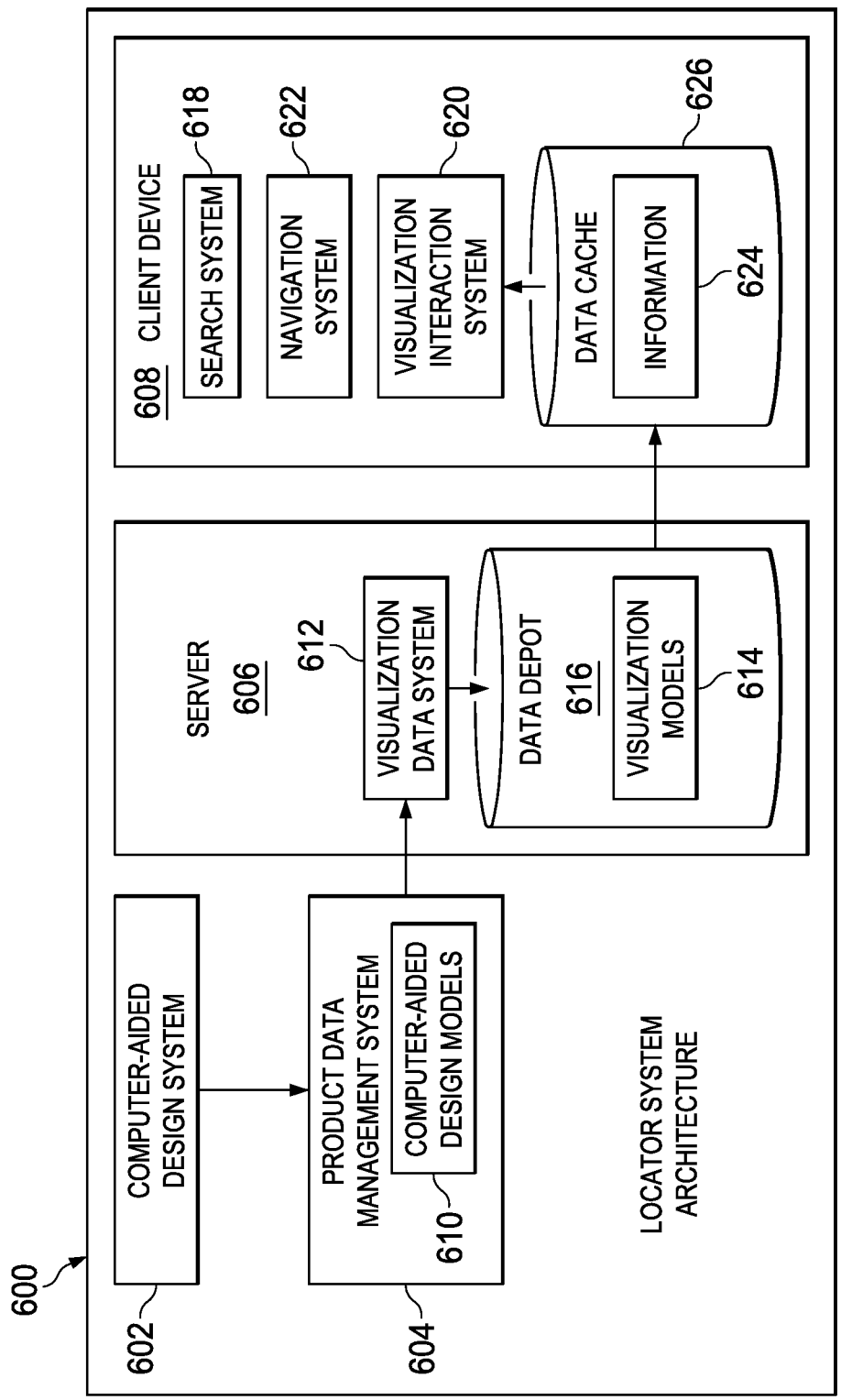
FIG. 6 is an illustration of a block diagram of an architecture for generating position information in accordance with an illustrative embodiment.

Turning now to FIG. 6, an illustration of a block diagram of an architecture for generating position information is depicted in accordance with an illustrative embodiment. In these illustrative examples, locator system architecture 600 may be used to generate position information 138 in FIG. 1 and in particular to generate series of views 252 in FIG. 2.

As depicted, locator system architecture 600 includes a number of different components. In this particular example, locator system architecture 600 includes computer-aided design (CAD) system 602, product data management system 604, server 606 and client device 608.

Computer-aided design system 602 is a hardware system that includes software. Computer-aided design system 602 is configured to generate computer-aided design models 610 of aircraft. Computer-aided design system 602 may be implemented using any currently used computer-aided design systems for designing objects.

In this illustrative example, the information for computer-aided design models 610 is stored in product data management system 604. Computer-aided design models 610 may include information used to edit, analyze, and perform other operations on computer-aided design models 610.

In these illustrative examples, computer-aided design models 610 in product data management system 604 contain large amounts of information to enable different features for accessing and manipulating computer-aided design models 610. The amount of information may be large enough that viewing a model in computer-aided design models 610 may take longer than desired, require more processor resources than desired, or some combination thereof.

As depicted, server 606 is a hardware system that includes software. In this illustrative example, visualization data system 612 is located in server 606. Visualization data system 612 is configured to create visualization models 614 from computer-aided design models 610 located in product data management system 604.

Visualization models 614 have less data than computer-aided design models 610. Information unnecessary to generate graphical representations of parts for display is not included in visualization models 614. In other words, visualization data system 612 may remove or filter out information not needed to visualize objects in computer-aided design models 610. Further, the structure or organization of data in computer-aided design models 610 may be arranged to increase the efficiency at which objects may be displayed as opposed to allowing for editing, creating, or otherwise manipulating computer-aided design models 610.

For example, information such as metadata used to enable editing of computer-aided design models 610 may be removed or excluded from visualization models 614. In particular, data in computer-aided design models 610 may be in a format that increases ease at which parts may be designed, rather than how quickly graphical representations of parts may be generated and displayed. Of course, visualization models 614 may be stored in any suitable format. Thus, the amount of information and the format of the information in visualization models 614 are selected to increase the speed at which portions or all of an aircraft may be displayed in client device 608.

As depicted, visualization models 614 are stored in data files, records in a database, tables, or some other suitable forms. In this illustrative example, visualization models 614 are stored in data depot 616. Data depot 616 is a storage system. Data depot 616 may be one location or may be distributed in different locations. In some illustrative examples, data depot 616 may be a database or some other suitable construct. In this illustrative example, data depot 616 may be specific to a particular line for aircraft. In other words, data depot 616 may be present for each aircraft being constructed. In other illustrative examples, data depot 616 may include models for multiple aircraft.

Client device 608 is a hardware device that may include software. Client device 608 is configured to display graphical representations of parts. In particular, client device 608 may be, for example, display device 250 in FIG. 2. Client device 608 may be configured to display series of views 252 in FIG. 2 in a manner that guides an operator to position 142 of part 144.

In this illustrative example, search system 618, visualization interaction system 620 and navigation system 622 are examples of components that may be used to visualize an aircraft and guide an operator to a part in aircraft. In particular, these components may be part of object visualizer 204. In other words, object visualizer 204 may be a distributed component in different positions.

As depicted, search system 618 is configured to receive information from an operator to identify parts. For example, search system 618 may receive information such as a part identifier identifying a part, coordinates for a part, or other suitable information. Based on the information received, search system 618 may send a query or request to visualization interaction system 620.

Visualization interaction system 620 is configured to generate series of views 252 in FIG. 2. These views may be generated from information 624 in data cache 626. For example, information 624 may be copies or instances of visualization models 614 stored in data cache 626. In this manner, client device 608 never actually manipulates or uses visualization models 614. Instead, copies or instances of visualization models 614 are stored in data cache 626.

Visualization interaction system 620 is configured to generate series of views 252 from information 624 in data cache 626. In these illustrative examples, information 624 may be a copy of a model in visualization models 614. Information 128 may be model 216 in FIG. 2.

In these illustrative examples, navigation system 622 is configured to provide guidance to an operator based on a position of client device 608. As depicted, navigation system 622 may include a sensor such as sensor 256 in FIG. 2.

The illustration of manufacturing environment 100 in the different components in FIGS. 1-6 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples are described with respect to an aircraft, an illustrative embodiment may be applied to other objects other than aircraft, such as, for example, without limitation, a vehicle, a submarine, a personnel carrier, a tank, a train, an automobile, a bus, a spacecraft, a surface ship, a spacecraft, a satellite, a rocket, an engine, a computer, harvesters, construction cranes, bulldozers, mining equipment, or other suitable types of objects.

As another illustrative example, display system 208 may include other display devices in addition to or in place of display device 250. Further, in some illustrative examples, display device 250 may not include sensor 256. Further, sensor 256 may be removably attached to display device 250.

In yet another illustrative example, although visualization interaction system 620 is depicted as being located in client device 608, visualization interaction system 620 may be in other positions depending on the particular implementation. For example, visualization interaction system 620 may be located in server 606 or some other position.

Figure 7:
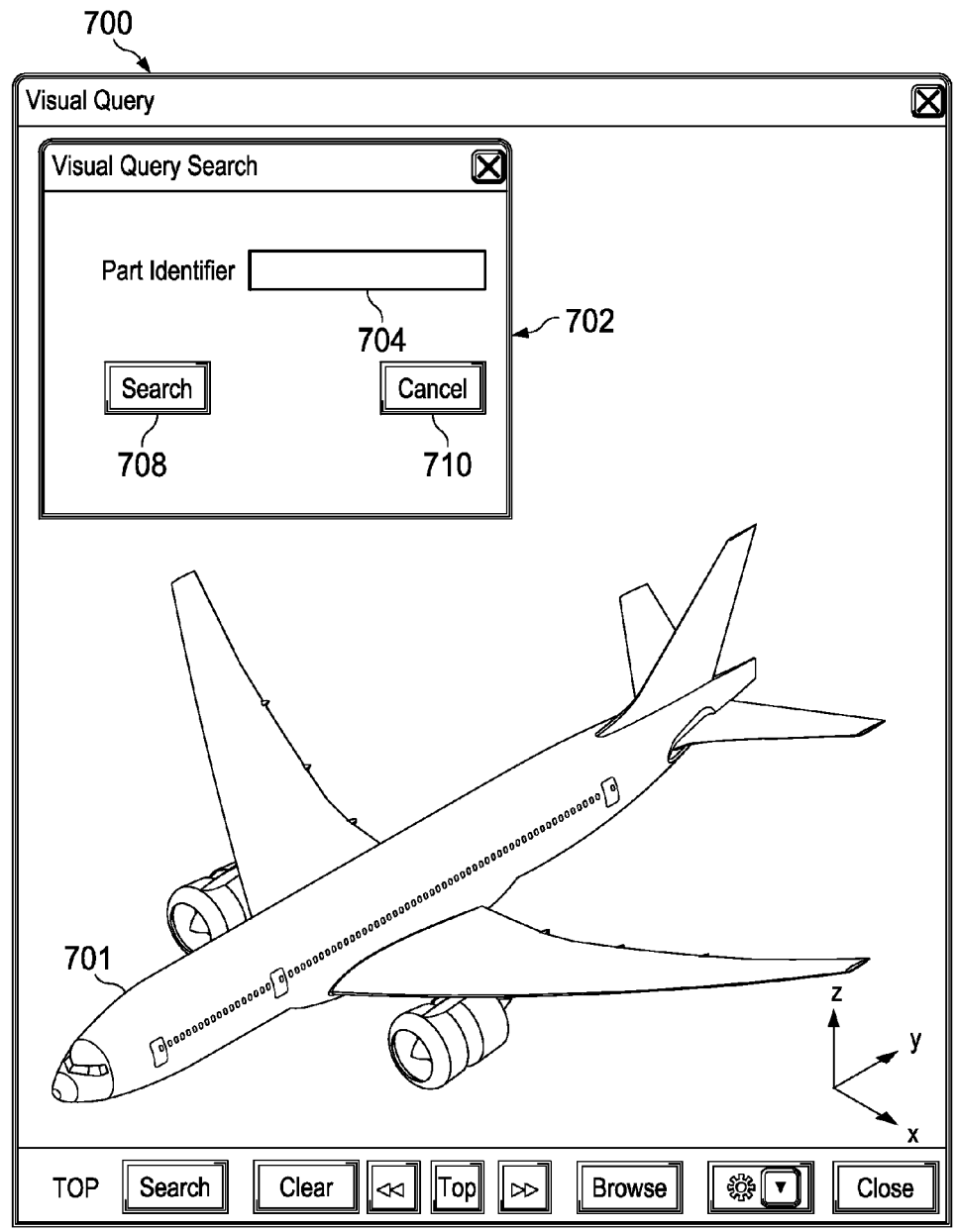
FIG. 7 is an illustration of a graphical user interface for identifying a part from a part identifier in accordance with an illustrative embodiment.
Figure 8:
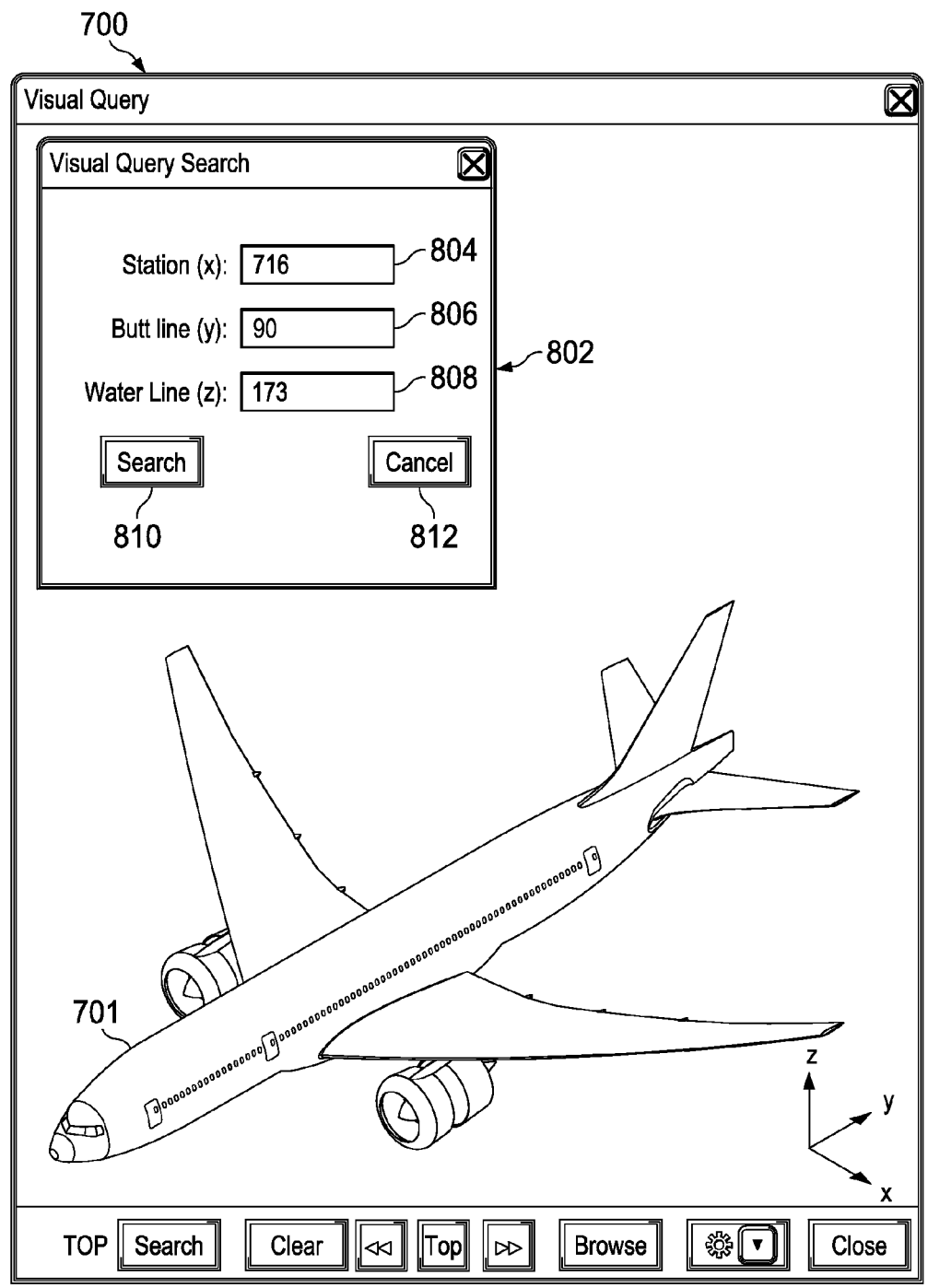
FIG. 8 is an illustration of a graphical user interface for identifying a part from coordinates in accordance with an illustrative embodiment.
Figure 9:
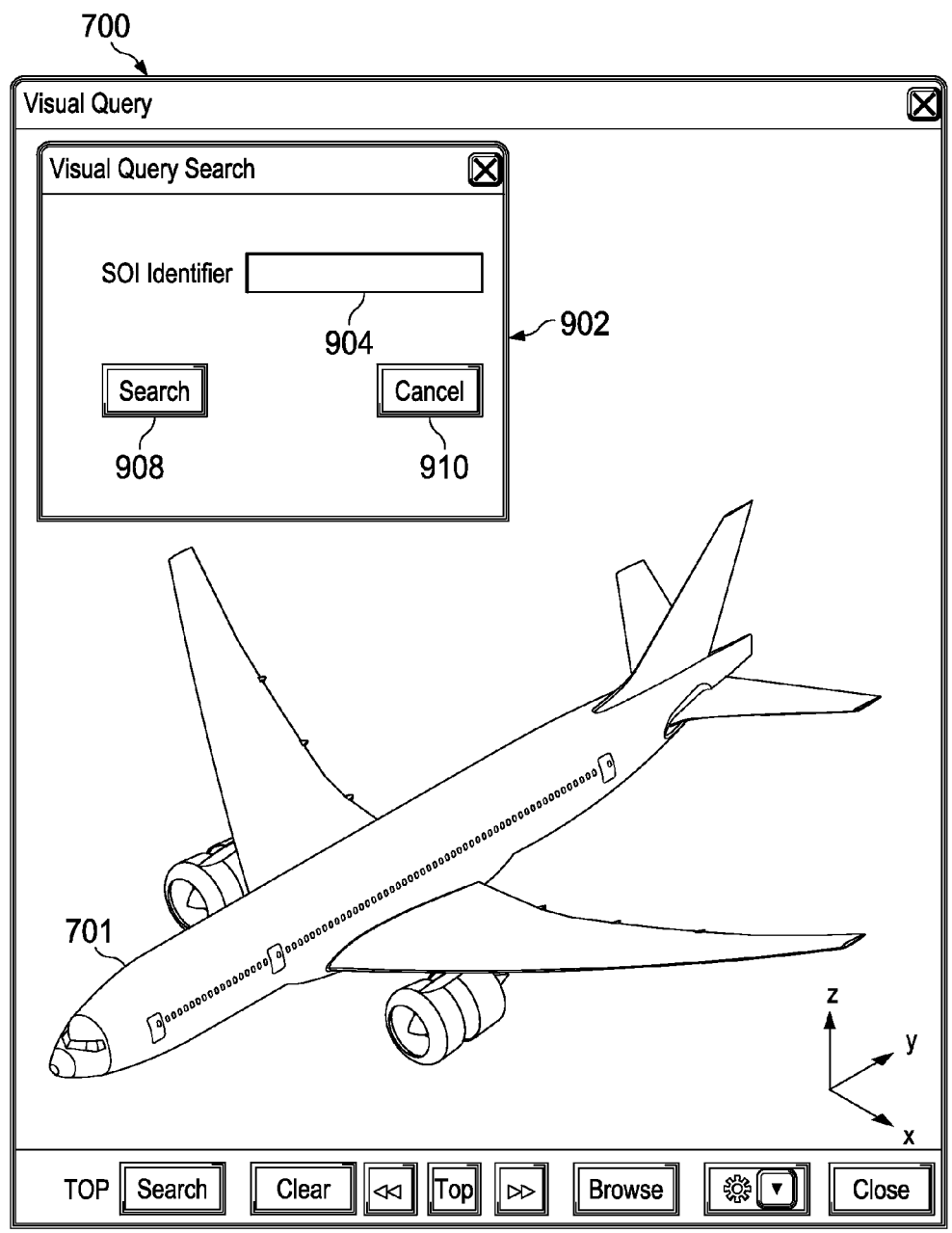
FIG. 9 is an illustration of a graphical user interface for identifying a part from a shop order instance identifier in accordance with an illustrative embodiment.

FIGS. 7-9 are illustrations of a graphical user interface for identifying a part in an object. The different graphical interfaces are illustrative examples of how a part can be identified to obtain position information to reach the part.

In FIG. 7, an illustration of a graphical user interface for identifying a part from a part identifier is depicted in accordance with an illustrative embodiment. In this illustrative example, graphical user interface 700 displays an object in the form of aircraft 701. A part may be located in aircraft 701 using window 702 in graphical user interface 700 in this particular example. Window 702 is configured to receive input for a part identifier in part identifier field 704. The part identifier identifies the part of interest and may be similar to part identifier 508 in FIG. 5.

The part identifier may be input into part identifier field 704 by selecting the part identifier from a drop down menu, entered by a keyboard or in some other suitable manner.

Select button 708 may be selected to start the search for the part. Cancel button 710 may be selected to cancel the search.

Next in FIG. 8, an illustration of a graphical user interface for identifying a part from coordinates is depicted in accordance with an illustrative embodiment. In this illustrative example, a part may be located in aircraft 701 using window 802 in graphical user interface 700 in this illustrative example.

As depicted, window 802 is configured to receive input for a part identifier in station coordinate field 804, butt line coordinate field 806, and water line coordinate field 808. These coordinate fields are aircraft coordinates and may correspond to x, y, and z coordinates. The coordinates define a three dimensional position of a part. Of course, the coordinate may be used for any position whether a part is present at the position.

In the illustrative example, select button 810 may be selected to start the search for the part. Cancel button 812 may be selected to cancel the search.

In FIG. 9, an illustration of a graphical user interface for identifying a part from a shop order instance identifier is depicted in accordance with an illustrative embodiment. A part may be located in aircraft 701 using window 902 in graphical user interface 700 in this depicted example.

In graphical user interface 700, window 902 is configured to receive input for a shop order instance identifier in shop order instance identifier field 904. The shop order instance identifier identifies a shop order instance and may be, for example, identifier 502 in shop order instance 500 in FIG. 5. From identifier 502, one or more parts may be identified using part identifier 508 in shop order instance 500 in FIG. 5.

The shop order instance (SOI) identifier may be input into SOI identifier field 904 by selecting the shop order instance identifier from a drop down menu, entered by a keyboard or in some other suitable manner.

Select button 908 may be selected to start the search for the part. Cancel button 910 may be selected to cancel the search.

In this manner, an operator may use graphical user interface 700 to identify a part that may be of interest to the operator. From this identification, object visualization system 134 in object manager 124 may generate position information 138 in FIG. 1 that guides the operator to a position of a part in an aircraft, such as aircraft 104 in FIG. 1.

Figure 10:
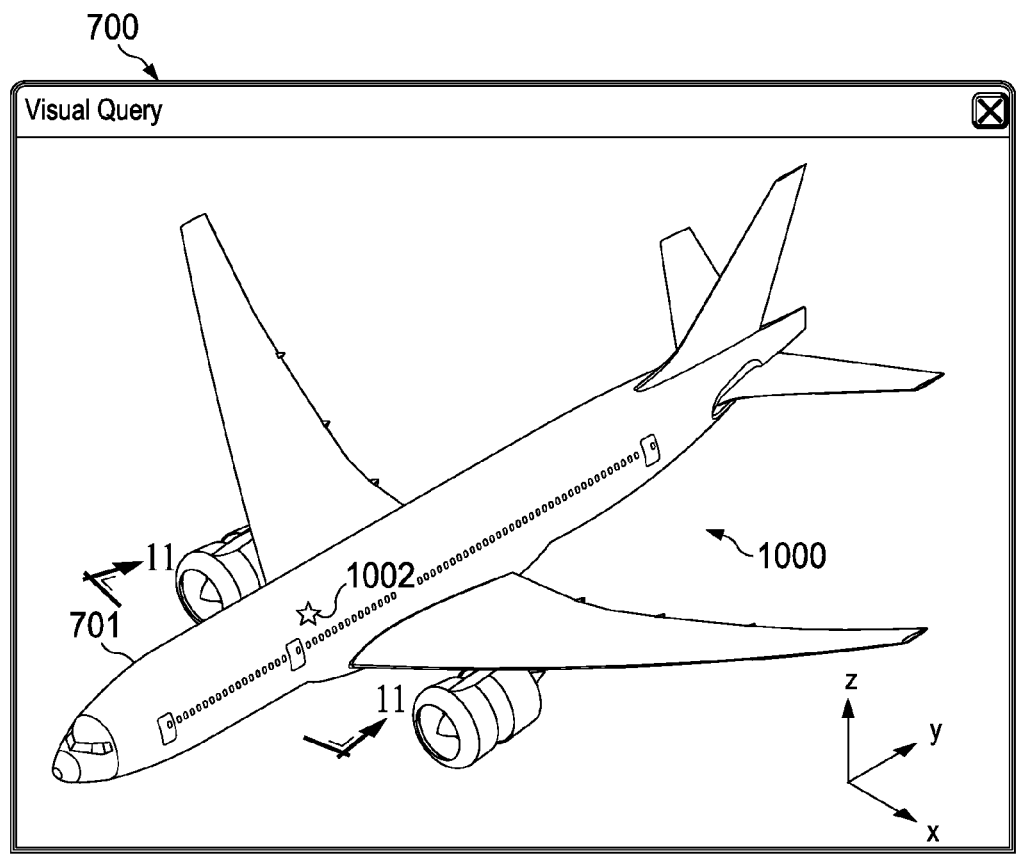
FIG. 10 is an illustration of a view from a series of views identifying a position of the part in accordance with an illustrative embodiment.

Next in FIGS. 10-13, illustrations of a series of views from a model for an aircraft with graphical indicators in the series of views configured to provide guidance to the position of a part of an aircraft are depicted in accordance with an illustrative embodiment. In FIG. 10, an illustration of a view from a series of views identifying a position of the part is depicted in accordance with an illustrative embodiment.

In this illustrative example, view 1000 is displayed to an operator in graphical user interface 700. As depicted, graphical indicator 1002 is displayed on aircraft 701 to form view 1000. Graphical indicator 1002 is displayed in view 1000 after an identification of a part. View 1000 is an example of a view in series of views 252 in FIG. 2.

As depicted, graphical indicator 1002 indicates a position of a part. In particular, graphical indicator 1002 is displayed in the position for the part. In this illustrative example, graphical indicator 1002 provides guidance to a position of a part in the aircraft. Graphical indicator 1002 indicates that the part is located just forward of the wings of aircraft 701. This view is a higher-level view as compared to other views described below.

Figure 11:
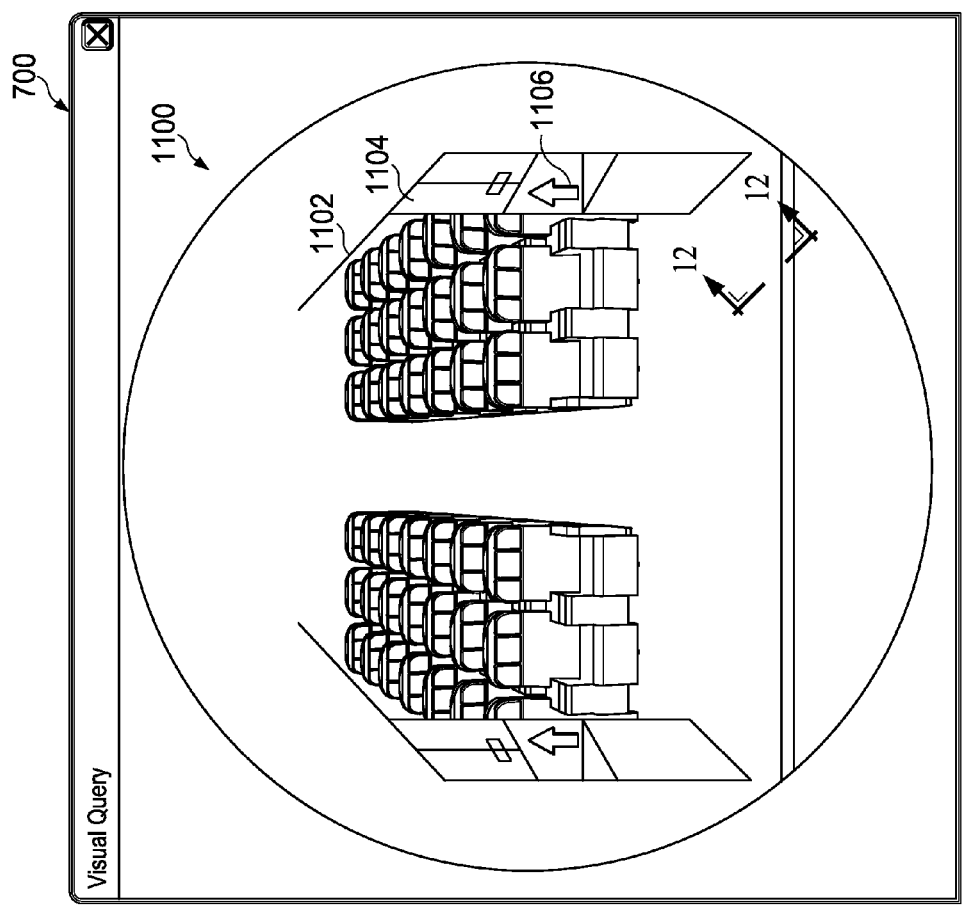
FIG. 11 is another illustration of a view from a series of views identifying a position of a part in accordance with an illustrative embodiment.

Turning now to FIG. 11, another illustration of a view from a series of views identifying a position of a part is depicted in accordance with an illustrative embodiment. As depicted, graphical user interface 700 displays view 1100. View 1100 is a cross-sectional view of aircraft 701 taken along lines 11-11 in FIG. 10. In this illustrative example, view 1100 provides a more detailed view of galley 1102 in aircraft 701 of where part 1104 is located. As depicted, part 1104 is a cabinet in galley 1102.

In this illustrative example, graphical indicator 1106 is associated with part 1104. In particular, graphical indicator 1106 takes the form of an arrow that indicates a position of part 1104 within galley 1102 in aircraft 701.

Figure 12:
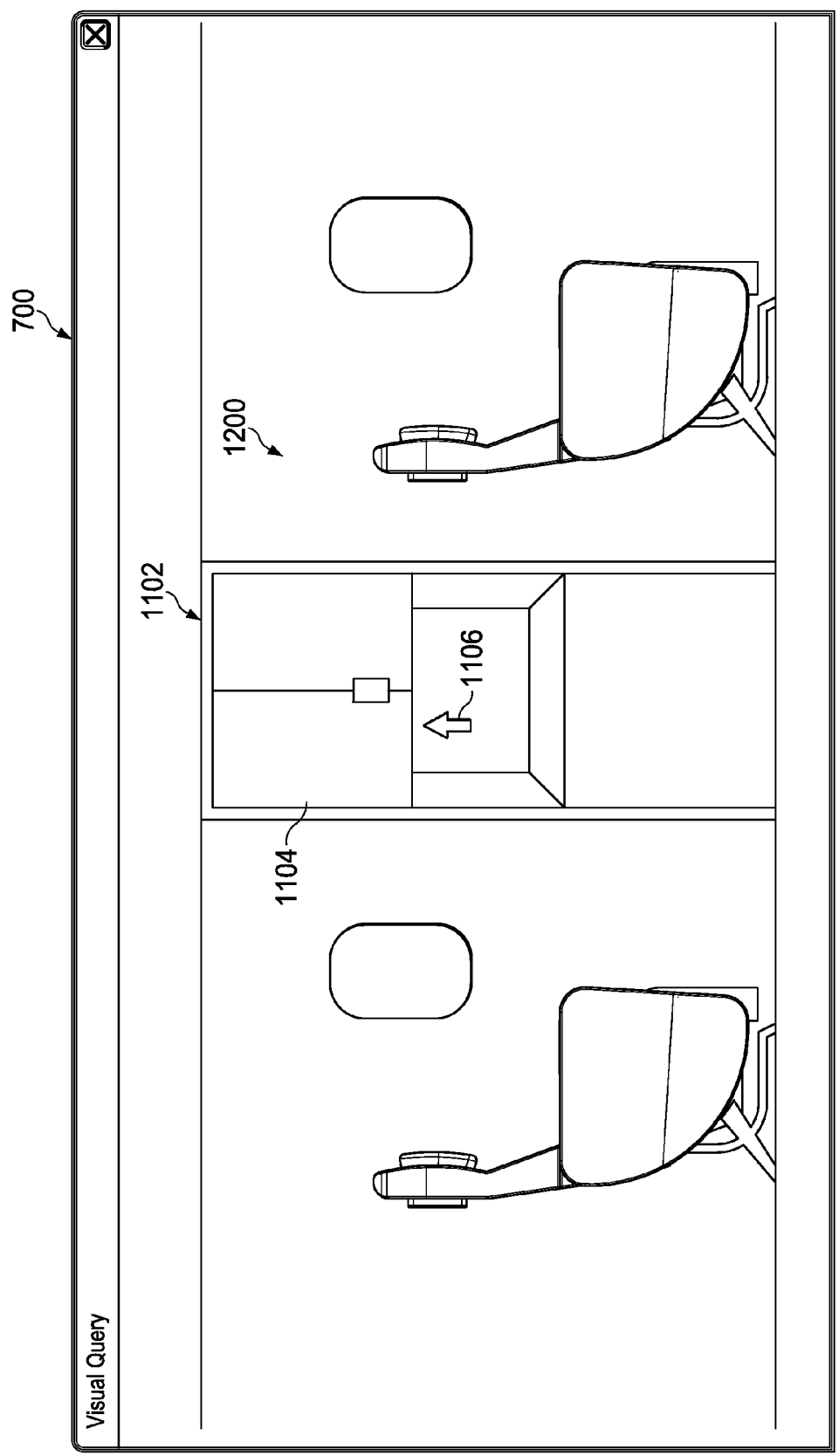
FIG. 12 is yet another illustration of a view from a series of views identifying the position of the part in accordance with an illustrative embodiment.

With reference next to FIG. 12, yet another illustration of a view from a series of views identifying the position of the part is depicted in accordance with an illustrative embodiment. As depicted, view 1200 in graphical user interface 700 is another view in a series of views identifying the position of part 1104. In particular, view 1200 is a view of galley 1102 seen along lines 12-12 in FIG. 11.

As depicted, view 1200 in graphical user interface 700 is another view in a series of views identifying the position of part 1104. In particular, graphical indicator 1106 is an arrow pointing to the position of part 1104 within galley 1102. As can be seen, view 1200 is a more detailed view of part 1104 as compared to view 1100 with part 1104.

Figure 13:
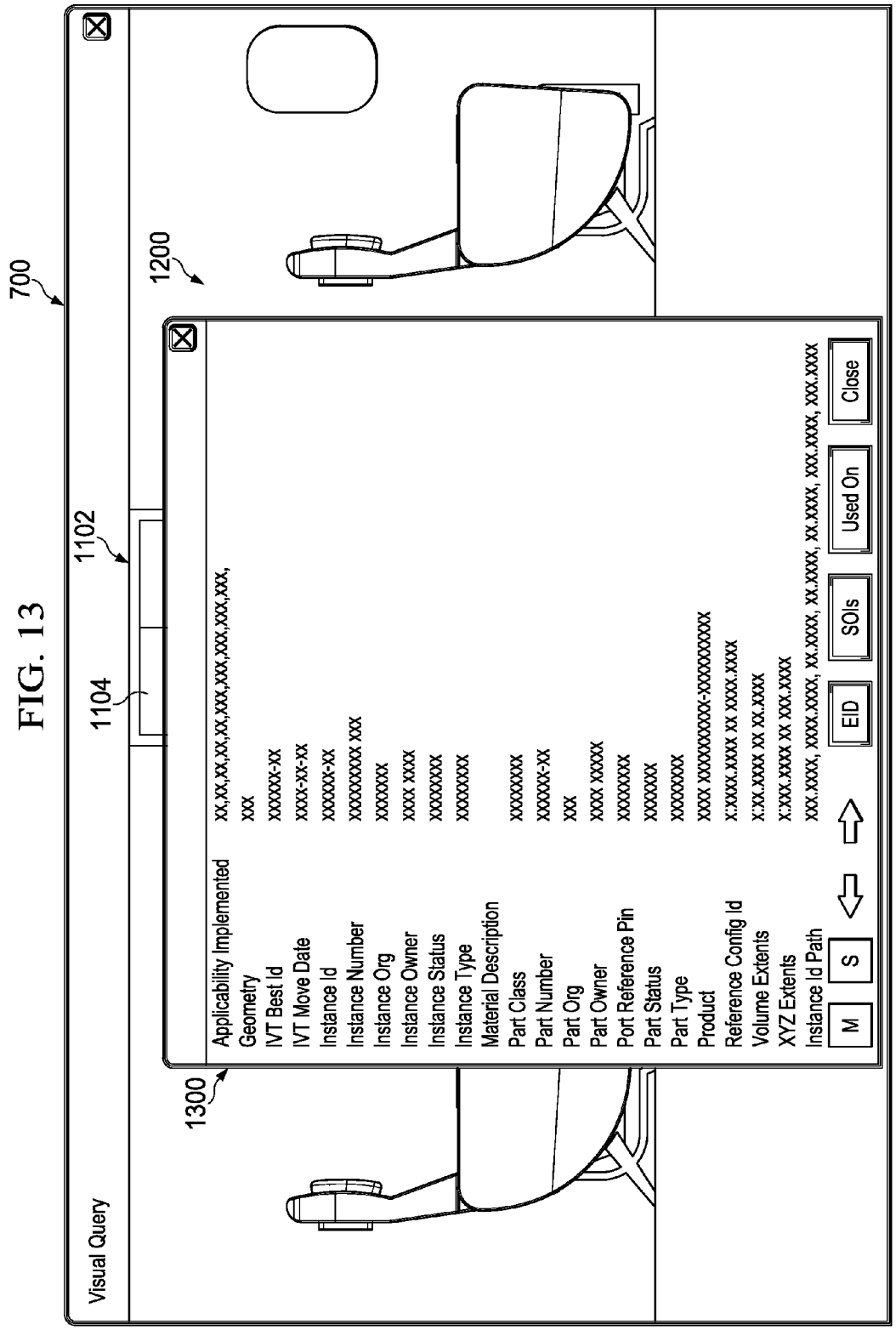
FIG. 13 is an illustration of information about a part in a view from a series of views identifying a position of the part in accordance with an illustrative embodiment.

Turning now to FIG. 13, an illustration of information about a part in a view from a series of views identifying a position of the part is depicted in accordance with an illustrative embodiment. In this illustrative example, window 1300 may be displayed in the display of view 1200 and graphical user interface 700. Window 1300 may be displayed in response to selection of part 1104.

As depicted, window 1300 provides information about part 1104. This information may be based on information from various sources. For example, information displayed in window 1300 may be obtained from at least one of shop order database 211, model database 215, inventory database 230, or some other suitable source.

In this manner, view 1000, view 1100, and view 1200 in the series of views illustrated in FIGS. 10-13 may provide an operator guidance to position of part 1104 in aircraft 701. In this manner, an operator does not need to know where coordinates of a part are in an aircraft. Instead, the series of views may be generated to guide the operator to the position of part 1104.

Figure 14:
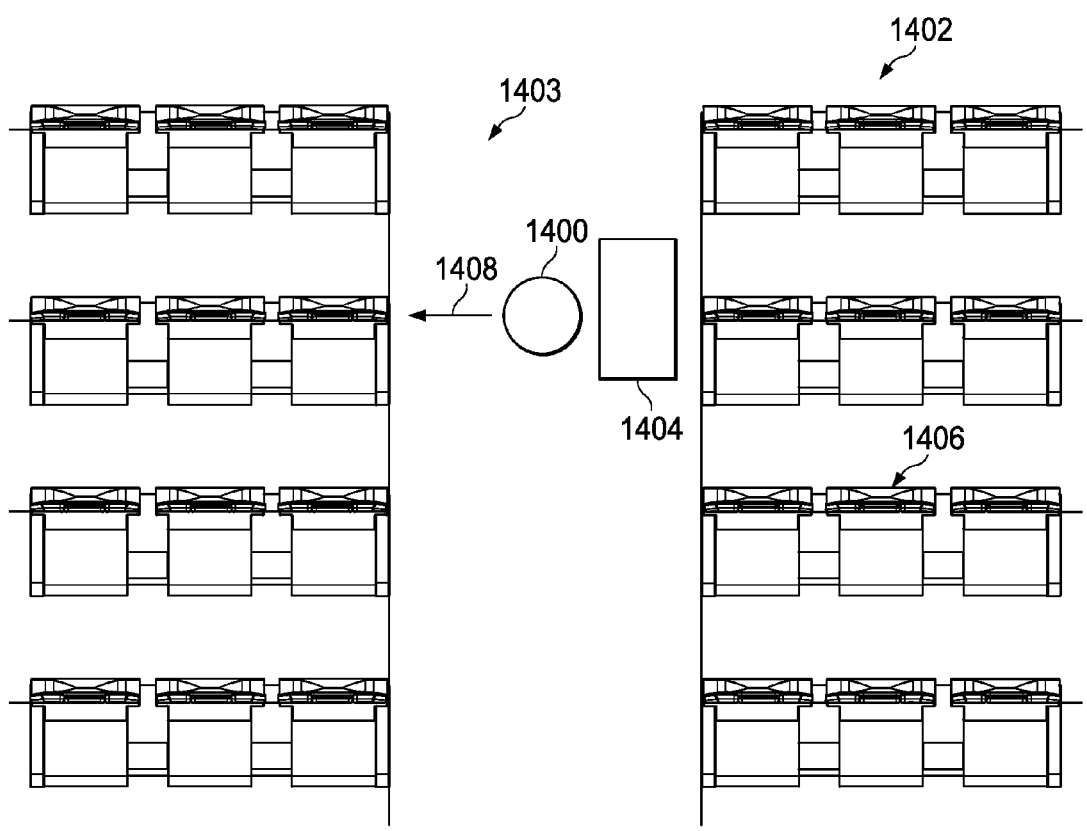
FIG. 14 is an illustration of an operator in an aircraft in accordance with an illustrative embodiment.

FIGS. 14-17 are illustrations of guidance being provided to an operator to locate a part in an object, such as an aircraft. Turning now to FIG. 14, an illustration of an operator in an aircraft is depicted in accordance with an illustrative embodiment. In this illustrative example, operator 1400 is shown from a top view within aircraft 1402. In this particular example, operator 1400 is in passenger cabin 1403 of aircraft 1402. Operator 1400 carries tablet computer 1404. Tablet computer 1404 is an example of one implementation for display device 250 in FIG. 2.

In this illustrative example, operator 1400 is looking for a part in the form of seat 1406 in passenger cabin 1403 of aircraft 1402. Operator 1400 is facing in a direction as indicated by arrow 1408.

In the illustrative examples, in addition to displaying a series of views on tablet computer 1404, the illustrative embodiments may also provide guidance to operator 1400 when operator 1400 is not facing a part, such as seat 1406. The guidance may be provided by identifying the location of operator 1400. The location may be the position of tablet computer 1404 as well as the orientation of tablet computer 1404 within aircraft 1402.

In this illustrative example, tablet computer 1404 may include a device configured to identify a location of tablet computer 1404 within aircraft 1402. This device may be, for example, an inertial measurement unit, a global positioning system receiver, or some other suitable device. Of course, in some illustrative examples, only the position of tablet computer 1404 may be identified without the orientation of tablet computer 1404.

Figure 15:
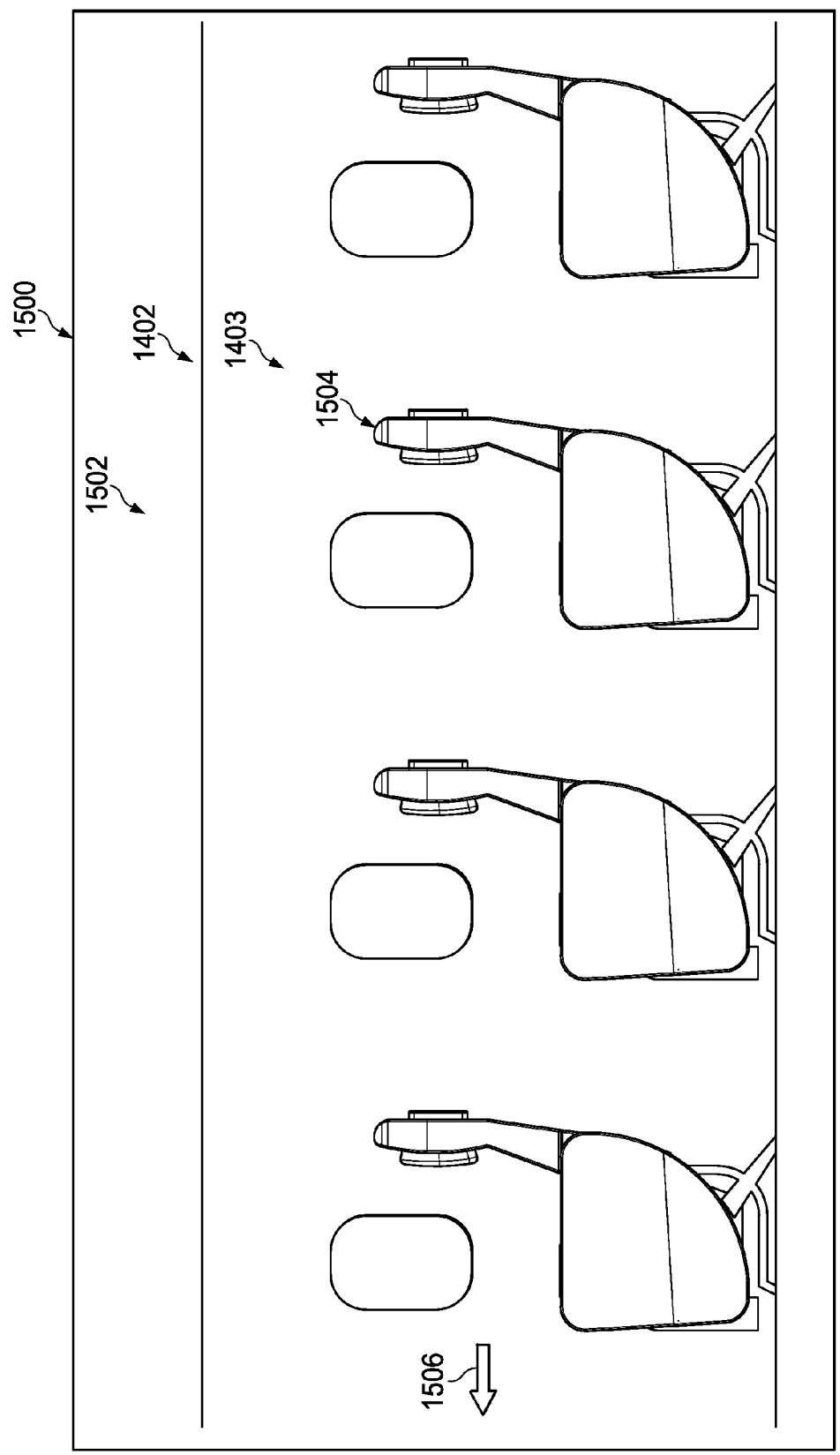
FIG. 15 is an illustration of a graphical user interface displayed on a display device in accordance with an illustrative embodiment.

Turning now to FIG. 15, an illustration of a graphical user interface displayed on a display device is depicted in accordance with an illustrative embodiment. As depicted, graphical user interface 1500 is an example of graphical user interface 207 in FIG. 2 that may be displayed on tablet computer 1404 in FIG. 14.

In this illustrative example, graphical user interface 1500 displays view 1502 from the perspective of operator 1400 facing in the direction of arrow 1408 in passenger cabin 1403. As can be seen, seats 1504 are shown in view 1502 in graphical user interface 1500.

Seat 1406 is not shown in view 1502 because tablet computer 1404 held by operator 1400 is pointed in the direction of arrow in 1408, which is in a direction away from seat 1406.

In this view, however, graphical indicator 1506 is displayed in view 1502 in graphical user interface 1500. Graphical indicator 1506 is an arrow indicating that the operator should turn in the direction of graphical indicator 1506 to see seat 1406.

Figure 16:
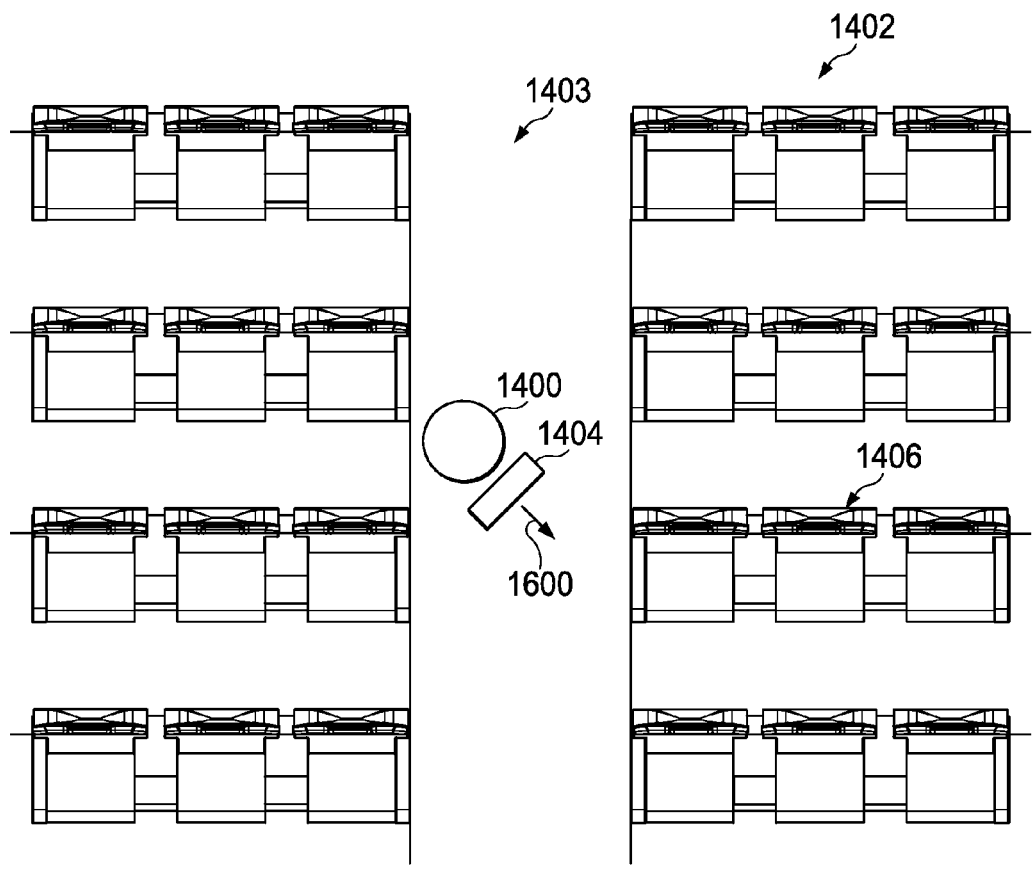
FIG. 16 is another illustration of an operator in an aircraft in accordance with an illustrative embodiment.

With reference next to FIG. 16, another illustration of an operator in an aircraft is depicted in accordance with an illustrative embodiment. In this figure, operator 1400 is now facing in the direction of arrow 1600. This direction is in the direction of seat 1406. The location of tablet computer 1404 is used to specify the viewpoint in the three-dimensional virtual environment displayed on tablet computer 1404. In this illustrative example, the location includes both the position and the orientation of tablet computer 1404.

Figure 17:
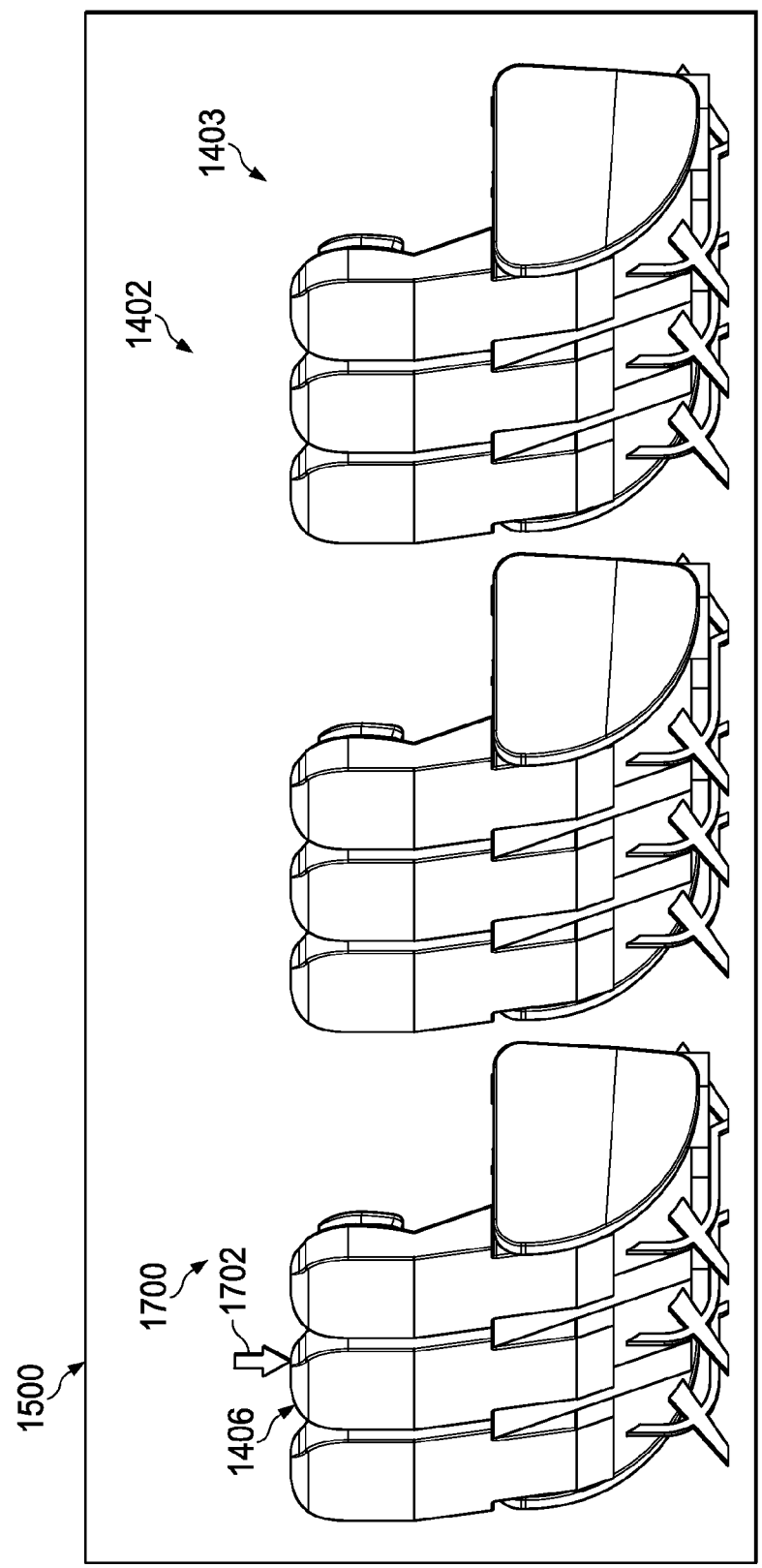
FIG. 17 is an illustration of a graphical user interface displayed on a display device in accordance with an illustrative embodiment.

With reference now to FIG. 17, an illustration of a graphical user interface displayed on a display device is depicted in accordance with an illustrative embodiment. As depicted, graphical user interface 1500 displays view 1700. View 1700 includes seat 1406. View 1700 is displayed because tablet computer 1404 now has a position facing seat 1406. In this view, graphical indicator 1702 is displayed providing guidance to the location of seat 1406. In particular, graphical indicator 1702 is an arrow pointing to seat 1406.

As can be seen with reference to FIGS. 15-17 above, additional guidance may be provided to an operator in addition to the series of views generated. This additional information may be generated when the display device of an operator includes a device that identifies the location of the display device.

The different graphical user interfaces and other figures illustrated in FIGS. 10-17 are not meant to limit the manner in which illustrative embodiments may be implemented and are provided as examples of some implementations for graphical user interface 207 in FIG. 2.

For example, other numbers of views in a series of views may be used in addition to the three views shown in FIGS. 10-12 to identify the position of a part. For example, four views, eight views, or some other number of views may be used depending on the particular position of the part.

As another example, although the graphical indicators take the form of arrows, other types of graphical indicators may be used. For example, the graphical indicators may be a color, animation, bolding, text, cross hatching, an icon, highlighting, or some other graphic indicator that may be associated with the graphical representation of the part displayed. For example, color or highlighting may be made to the graphical representation of the parts. The part may be animated or an icon drawing attention to the part may be animated. These other types of graphical indicators may be used to aid an operator to locate a part.

In yet another illustrative example, although views are shown relative to the location of the display device in FIG. 15 and FIG. 17, other types of displays may be used. For example, instead of generating a view from a model, a virtual-reality display or augmented reality display may be used. In one illustrative example, the display device may include a camera that faces in the desired direction. The camera may be used to generate an augmented reality display in which graphical indicators are used to point to the position of a part or to indicate the direction that an operator should travel or turn to reach a part.

Further, although the different examples are displayed with reference to aircraft, similar displays may be used for other types of vehicles or objects. For example, the graphical user interfaces may be configured to display shop order instance information and graphical representations of objects such as an automobile, a ship, a satellite, an engine, or some other suitable type of object.

Figure 18:
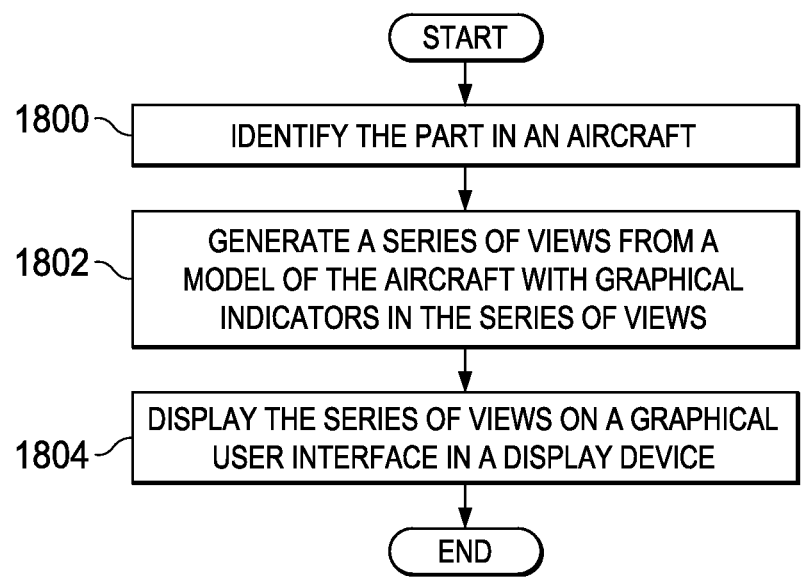
FIG. 18 is an illustration of a flowchart of a process for locating a part in accordance with an illustrative embodiment.

With reference now to FIG. 18, an illustration of a flowchart of a process for locating a part is depicted in accordance with an illustrative embodiment. The process illustrated FIG. 18 may be used to locate a part in an object such as an aircraft. The process illustrated in FIG. 18 may be implemented in object visualization system 134 in object manager 124 in FIG. 1.

The process begins by identifying the part in an aircraft (operation 1800). The identification of the part to be performed may be identified in a number of different ways. For example, the part may be identified based on a part identifier for the part, a shop order instance, a coordinate, or in some other manner.

The process then generates a series of views from a model of the aircraft with graphical indicators in the series of views (operation 1802). The graphical indicators in the series of views are configured to provide guidance to the position of the part in the aircraft. The series of views are then displayed on a graphical user interface in a display device (operation 1804), with the process terminating thereafter.

Figure 19:
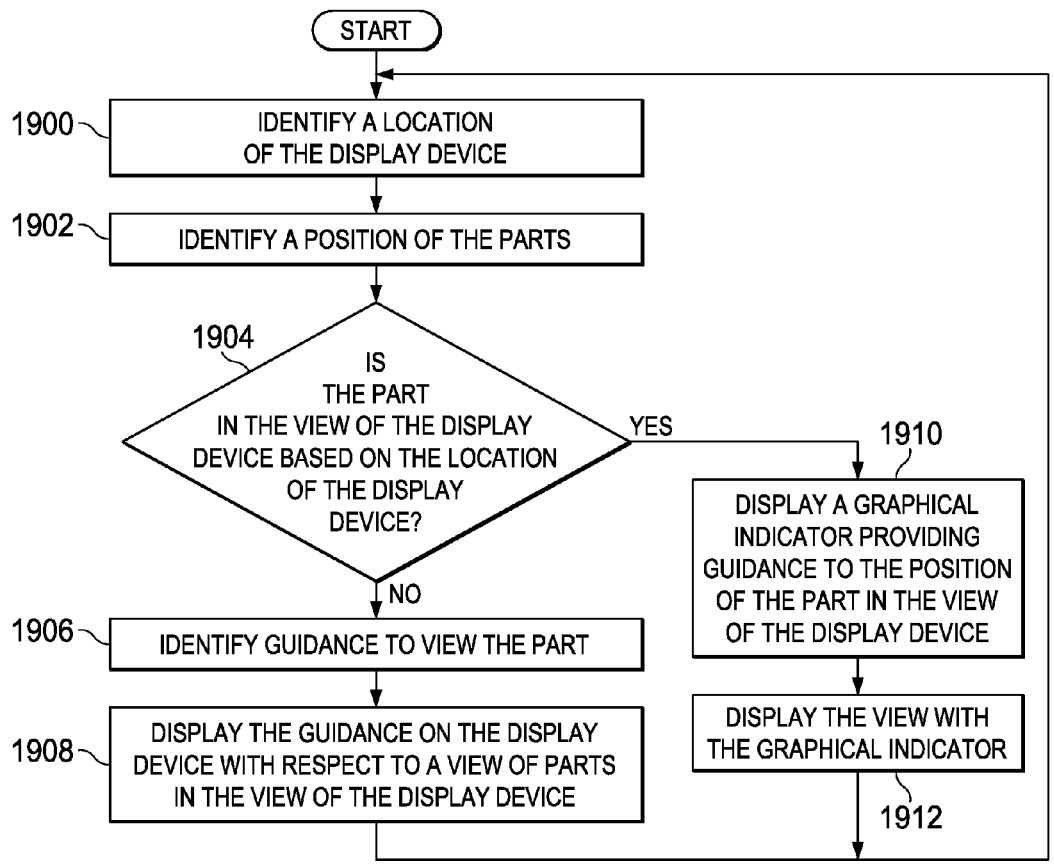
FIG. 19 is an illustration of a flowchart of a process for providing enhanced guidance to the position of the part in accordance with an illustrative embodiment.

Turning now to FIG. 19, an illustration of a flowchart of a process for providing enhanced guidance to the position of the part is depicted in accordance with an illustrative embodiment. The process illustrated in FIG. 19 may be implemented using a display device in which a device is present to identify the location of the display device.

The process begins by identifying a location of the display device (operation 1900). In these illustrative examples, the location of the display device includes the position of the display device in three dimensions and the orientation of the display device. In some cases, the position may be only two dimensions (planar) depending on the particular implementation. In these illustrative examples, the position of the display device may be identified using aircraft coordinates for the aircraft.

The process then identifies a position of the parts (operation 1902). The position of the part may be identified from coordinates of the part in the model of the aircraft.

A determination is made as to whether the part is in the view of the display device based on the location of the display device (operation 1904). The view may be identified as a viewpoint for the display device based on the direction the display device is pointing. In these illustrative examples, the side of the display device opposite to the screen may be considered the front of the display device. The view may be based on a field of view that may be defined in degrees.

If the part is not in the view of the display device, the process identifies guidance to view the part (operation 1906). In this operation, the process may determine whether the operator needs to move in a particular direction or turn any particular direction. In these illustrative examples, the guidance may be, for example, a graphical indicator such as an arrow guiding the operator to turn or move in a particular direction. In other illustrative examples, the guidance may be a graphical indicator in the form of text providing instructions on which way to turn or move. Of course, other types of graphical indicators may be used to provide guidance to the operator.

The process then displays the guidance on the display device with respect to a view of parts in the view of the display device (operation 1908). The process then returns to operation 1900.

With reference again to operation 1904, if the part is within the view of the display device, a graphical indicator is displayed, providing guidance to the position of the part in the view of the display device (operation 1910). In operation 1910, a view is created based on the orientation of the display device. This view is created from a model of the aircraft in this illustrative example. The process then displays the view with the graphical indicator (operation 1912) with the process then returning to operation 1900.

Figure 20:
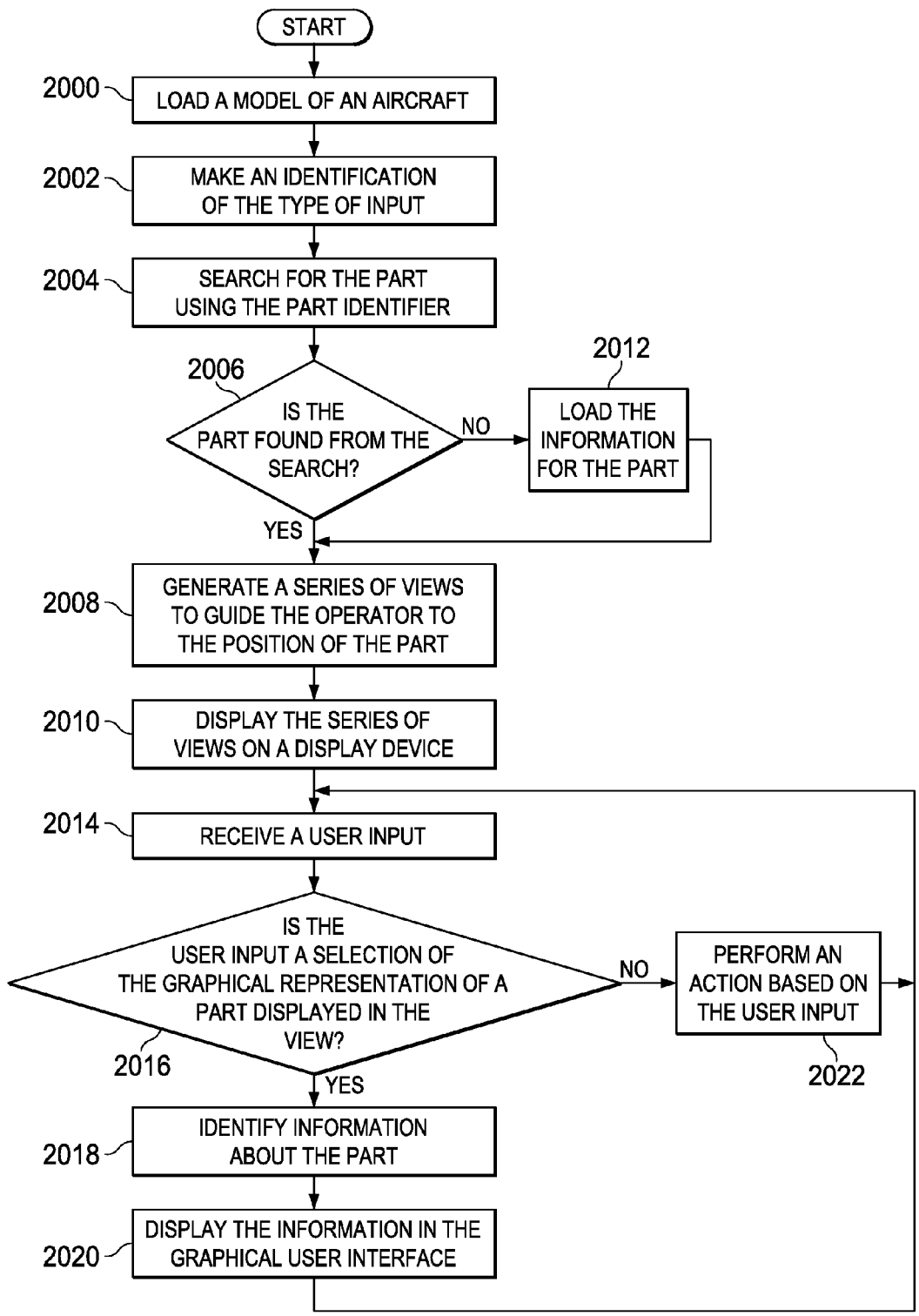
FIG. 20 is an illustration of a flowchart of a process for locating parts in accordance with an illustrative embodiment.

With reference next to FIG. 20, an illustration of a flowchart of a process for locating parts is depicted in accordance with an illustrative embodiment. The process illustrated in FIG. 20 may be applied to locate a part in an object such as an aircraft or other suitable type of object. The process illustrated in FIG. 20 may be implemented in object visualization system 134 in object manager 124 in FIG. 1. In the illustrative examples, this process may be implemented in locator system architecture 600 in FIG. 6. In particular, the process may be located in server 606 in FIG. 6.

The process begins by loading a model of an aircraft (operation 2000). In operation 2000, the model of the aircraft may be identified from a user selection of a particular aircraft. This aircraft may be a particular configuration or line that is being assembled or has recently been assembled for a customer. The model may be, for example, model 216 in FIG. 2. Model 216 may be optimized for visualizing parts rather than for design purposes.

An identification of the type of input is made (operation 2002). If the input is an identification of a known part, the process searches for the part using the part identifier (operation 2004). In this illustrative example, the search is made within the model that has been loaded for the aircraft.

A determination is made as to whether the part is found from the search (operation 2006). If the part is found, a series of views is generated to guide the operator to the position of the part (operation 2008). In this illustrative example, the series of views may be series of views 252 in FIG. 2. The process then displays the series of views on a display device (operation 2010). In these illustrative examples, the series of views may be displayed at different times. The display of series of views may be based on the position of the operator, operator input, or some combination thereof.

With reference again to operation 2006, if the part is not found, then the information for the part is loaded (operation 2012). In operation 2012, the information for this part may not have been previously loaded. As a result, the part may not be found without loading the information for the part in operation 2012. The process then also proceeds to operation 2008 as described above.

After the series of views is displayed in operation 2010, a user input is received (operation 2014). A determination is made as to whether the user input is a selection of the graphical representation of a part displayed in the view (operation 2016). In operation 2016, the part may be the part for which the position has been identified or may be another part displayed in the view.

If the user input is a selection of the part graphically represented in the view, the process identifies information about the part (operation 2018). Thereafter, the information is displayed in the graphical user interface (operation 2020). The process then returns to operation 2014.

With reference again to operation 2016, if the user input is not a selection of a graphical representation of the part, the process then performs an action based on the user input (operation 2022), with the process then returning to operation 2014. In operation 2022, the user input may cancel the process, select a new part, or perform some other action. If the user input cancels the process, the process no longer returns operation 2014.

In this manner, more precise guidance may be provided to an operator to find the position of the part. Finding a part in an aircraft or other object may be performed more quickly. As a result, forming tasks such as assembly of an aircraft, maintenance of an aircraft, and other suitable tasks may be performed more quickly and with less expense.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the different operations illustrated in the flowcharts above may be performed for more than one part. Further, the different operations may be performed to locate parts and other objects other than aircraft as described above.

Turning now to FIG. 21, an illustration of a block diagram of a data processing system is depicted in accordance with an illustrative embodiment. Data processing system 2100 may be used to implement computer system 126 in FIG. 1, display device 250 in FIG. 2, as well as other devices that may be used in different illustrative examples. In this illustrative example, data processing system 2100 includes communications framework 2102, which provides communications between processor unit 2104, memory 2106, persistent storage 2108, communications unit 2110, input/output unit 2112, and display 2114. In this example, communications framework may take the form of a bus system.

Processor unit 2104 serves to execute instructions for software that may be loaded into memory 2106. Processor unit 2104 may be a number of processors, a multi-processor core, or some other type of processor, depending on the particular implementation.

Memory 2106 and persistent storage 2108 are examples of storage devices 2116. A storage device is any piece of hardware that is capable of storing information, such as, for example, without limitation, data, program code in functional form, and/or other suitable information either on a temporary basis and/or a permanent basis. Storage devices 2116 may also be referred to as computer readable storage devices in these illustrative examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that may be connected to data processing system 2100. For example, input/output unit 2112 may provide a connection for user input through a keyboard, a mouse, and/or some other suitable input device. Further, input/output unit 2112 may send output to a printer. Display 2114 provides a mechanism to display information to a user.

Instructions for the operating system, applications, and/or programs may be located in storage devices 2116, which are in communication with processor unit 2104 through communications framework 2102. The processes of the different embodiments may be performed by processor unit 2104 using computer-implemented instructions, which may be located in a memory, such as memory 2106.

These instructions are referred to as program code, computer usable program code, or computer readable program code that may be read and executed by a processor in processor unit 2104. The program code in the different embodiments may be embodied on different physical or computer readable storage media, such as memory 2106 or persistent storage 2108.

Program code 2118 is located in a functional form on computer readable media 2120 that is selectively removable and may be loaded onto or transferred to data processing system 2100 for execution by processor unit 2104. Program code 2118 and computer readable media 2120 form computer program product 2122 in these illustrative examples.

In one example, computer readable media 2120 may be computer readable storage media 2124 or computer readable signal media 2126. In these illustrative examples, computer readable storage media 2124 is a physical or tangible storage device used to store program code 2118 rather than a medium that propagates or transmits program code 2118.

Alternatively, program code 2118 may be transferred to data processing system 2100 using computer readable signal media 2126. Computer readable signal media 2126 may be, for example, a propagated data signal containing program code 2118. For example, computer readable signal media 2126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2100 are not meant to provide architectural limitations to the manner in which different embodiments may be implemented. The different illustrative embodiments may be implemented in a data processing system including components in addition to and/or in place of those illustrated for data processing system 2100. Other components shown in FIG. 21 can be varied from the illustrative examples shown. The different embodiments may be implemented using any hardware device or system capable of running program code 2118.

Illustrative embodiments of the disclosure may be described in the context of aircraft manufacturing and service method 2200 as shown in FIG. 22 and aircraft 2300 as shown in FIG. 23. Turning first to FIG. 22, an illustration of a block diagram of an aircraft manufacturing and service method is depicted in accordance with an illustrative embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 may go through certification and delivery 2210 in order to be placed in service 2212. While in service 2212 by a customer, aircraft 2300 in FIG. 23 is scheduled for routine maintenance and service 2214, which may include modification, reconfiguration, refurbishment, and other maintenance or service.

Each of the processes of aircraft manufacturing and service method 2200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of a block diagram of an aircraft is depicted in which an illustrative embodiment may be implemented. In this example, aircraft 2300 is produced by aircraft manufacturing and service method 2200 in FIG. 22 and may include airframe 2302 with systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2200 in FIG. 22.

For example, one or more illustrative embodiments may be implemented during system integration 2208. The different illustrative examples may be implemented to identify a position of parts when performing tasks to assemble parts on aircraft 2300. Additionally, an illustrative embodiment also may be implemented during maintenance and service 2214 to identify the position of parts. For example, the identification of positions of pats in aircraft 2300 may be identified during maintenance, upgrades, refurbishment, and other operations during maintenance and service 2214.

Figure 24:
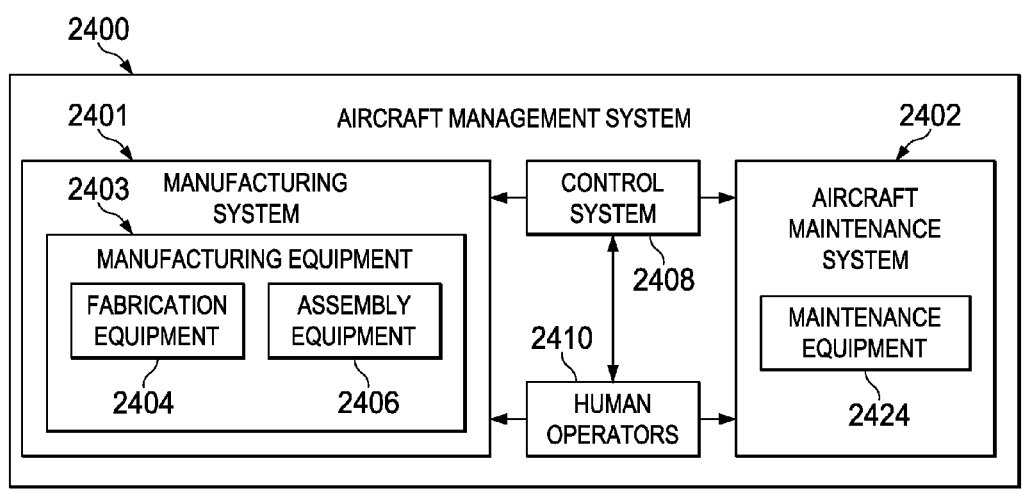
FIG. 24 is an illustration of a block diagram of an aircraft management system in accordance with an illustrative embodiment.

Turning now to FIG. 24, an illustration of a block diagram of a management system is depicted in accordance with an illustrative embodiment. Aircraft management system 2400 is a physical hardware system. In this illustrative example, aircraft management system 2400 may include at least one of manufacturing system 2401 or aircraft maintenance system 2402.

Manufacturing system 2401 is configured to manufacture products, such as aircraft 2300 in FIG. 23. As depicted, manufacturing system 2401 includes manufacturing equipment 2403. Manufacturing equipment 2403 includes at least one of fabrication equipment 2404 or assembly equipment 2406.

Fabrication equipment 2404 is equipment that may be used to fabricate components for parts used to form aircraft 2300. For example, fabrication equipment 2404 may include machines and tools. These machines and tools may be at least one of a drill, a hydraulic press, a furnace, a mold, a composite tape laying machine, a vacuum system, a lathe, or other suitable types of equipment. Fabrication equipment 2404 may be used to fabricate at least one of metal parts, composite parts, semiconductors, circuits, fasteners, ribs, skin panels, spars, antennas, or other suitable types of parts.

Assembly equipment 2406 is equipment used to assemble parts to form aircraft 2300. In particular, assembly equipment 2406 may be used to assemble components and parts to form aircraft 2300. Assembly equipment 2406 also may include machines and tools. These machines and tools may be at least one of a robotic arm, a crawler, a faster installation system, a rail-based drilling system, or a robot. Assembly equipment 2406 may be used to assemble parts such as seats, horizontal stabilizers, wings, engines, engine housings, landing gear systems, and other parts for aircraft 2300.

In this illustrative example, aircraft maintenance system 2402 includes maintenance equipment 2424. Maintenance equipment 2424 may include any equipment needed to perform maintenance on aircraft 2300. This maintenance may include tools for performing different operations on parts on aircraft 2300. These operations may include at least one of disassembling parts, refurbishing parts, inspecting parts, reworking parts, manufacturing placement parts, or other operations for performing maintenance on aircraft 2300. These operations may be for routine maintenance, inspections, upgrades, refurbishment, or other types of maintenance operations.

In the illustrative example, maintenance equipment 2424 may include ultrasonic inspection devices, x-ray imaging systems, vision systems, drills, crawlers, and other suitable device. In some cases, maintenance equipment 2424 may include fabrication equipment 2404, assembly equipment 2406, or both to produce and assemble parts that may be needed for maintenance.

Aircraft management system 2400 also includes control system 2408. Control system 2408 is a hardware system and may also include software or other types of components. Control system 2408 is configured to control the operation of at least one of manufacturing system 2401 or aircraft maintenance system 2402. In particular, control system 2408 may control the operation of at least one of fabrication equipment 2404, assembly equipment 2406, or maintenance equipment 2424.

The hardware in control system 2408 may be using hardware that may include computers, circuits, networks, and other types of equipment. The control may take the form of direct control of manufacturing equipment 2403. For example, robots, computer-controlled machines, and other equipment may be controlled by control system 2408. In other illustrative examples, control system 2408 may manage operations performed by human operators 2410 in manufacturing or performing maintenance on aircraft 2300. In these illustrative examples, object manager 124 in FIG. 1 may be implemented in control system 2408 to manage the manufacturing of aircraft 2300 in FIG. 23.

In the different illustrative examples, human operators 2410 may operate or interact with at least one of manufacturing equipment 2403, maintenance equipment 2424, or control system 2408. This interaction may be performed to manufacture aircraft 2300.

Of course, aircraft management system 2400 may be configured to manage other products other than aircraft 2300. Although aircraft management system 2400 has been described with respect to manufacturing in the aerospace industry, aircraft management system 2400 may be configured to manage products for other industries. For example, aircraft management system 2400 may be configured to manufacture products for the automotive industry as well as any other suitable industries.

In this manner, operators may visualize information about the position of different parts. Further, the visualization may guide human operators 2410 to reach different parts to perform manufacturing, maintenance, or some combination thereof for aircraft 2300.

The visualization may be performed without operators having to know coordinates for positions in the aircraft. In these illustrative examples, the graphical user interface displays graphical representations of the aircraft that allow the operators to view different portions of the aircraft without using coordinates to traverse the views of the aircraft. Further, if an operator has guidance to a position for a part, then the operator may more easily travel to the position of the part in the aircraft. As a result, the operator may more easily perform operations such as assembly or maintenance on the aircraft.

Thus, with one or more illustrative embodiments, obtaining positions of parts to perform tasks using an illustrative embodiment may reduce the amount of time needed by operators performing tasks to assemble an aircraft and other objects. Further, using an illustrative embodiment also may reduce the time needed to locate parts to perform maintenance on an aircraft and other objects.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   an object manager configured to
      identify a part in an aircraft;
      generate a series of views from a model of the aircraft with graphical indicators in the series of views configured to provide guidance to a position of the part in the aircraft;
      display the series of views on a display device; and
      display a view of a volume in the model of the aircraft corresponding to a physical position and a physical orientation of the display device with a graphical indicator indicating a direction to the position of the part when the part is absent from the view displayed on the display device;
   wherein a visualization data system creates the model as a visualization model from a computer-aided design model such that the visualization model includes only portions of the computer-aided design model needed to visualize the computer-aided design model;
   wherein a format of the information in the visualization model is selected to increase a speed at which a portion of the aircraft is displayed on the display device;
   wherein metadata used to enable editing of the computer-aided design model is removed from the visualization model; and
   wherein the visualization model is stored in a data depot that is a storage system specific to a particular line for the aircraft.

2. The apparatus of claim 1, wherein in being configured to identify the part, the object manager is configured to identify the part from a part identifier for the part.

3. The apparatus of claim 1, wherein in being configured to identify the part, the object manager is configured to identify the part from coordinates for the part.

4. The apparatus of claim 1, wherein a view in the series of views provides a more detailed view of the part in the aircraft than a prior view in the series of views.

5. The apparatus of claim 1, wherein the object manager is further configured to identify the physical position of the display device relative to the aircraft and display the view of the volume in the model of the aircraft corresponding to the physical position of the display device relative to the aircraft.

6. The apparatus of claim 5, wherein in being configured to identify the physical position of the display device relative to the aircraft and display the view of the volume in the model of the aircraft corresponding to the physical position of the display device relative to the aircraft, the object manager is configured to identify the physical position and the physical orientation of the display device relative to the aircraft and display the view of the volume in the model of the aircraft corresponding to the physical position and the physical orientation of the display device relative to the aircraft.

7. The apparatus of claim 6, wherein in being configured to display the view of the volume in the model of the aircraft corresponding to the physical position and the physical orientation of the display device to the aircraft, the object manager is configured to display the view of the volume in the model of the aircraft corresponding to the physical position and the physical orientation of the display device with a graphical indicator associated with the part when the part is in the view displayed on the display device.

8. An apparatus comprising:
   an object manager configured to
      identify a part in an object;
      generate a series of views from a model of the object with graphical indicators in the series of views configured to provide guidance to a position of the part in the object;
      display the series of views on a display device; and
      display a view of a volume in the model of the object corresponding to a physical position and a physical orientation of the display device with a graphical indicator indicating a direction to the position of the part when the part is absent from the view displayed on the display device;
   wherein a visualization data system creates the model as a visualization model from a computer-aided design model such that the visualization model includes only portions of the computer-aided design model needed to visualize the computer-aided design model;
   wherein a format of the information in the visualization model is selected to increase a speed at which a portion of the object is displayed on the display device;
   wherein metadata used to enable editing of the computer-aided design model is removed from the visualization model; and
   wherein the visualization model is stored in a data depot that is a storage system specific to a particular line for the object.

9. The apparatus of claim 8, wherein the object manager is further configured to identify the physical position of the display device relative to the object and display the view of the volume in the model of the object corresponding to the physical position of the display device relative to the object.

10. The apparatus of claim 9, wherein in being configured to identify the physical position of the display device relative to the object and display the view of the volume in the model of the object corresponding to the physical position of the display device relative to the object, the object manager is configured to identify the physical position and the physical orientation of the display device relative to the object and display the view of the volume in the model of the object corresponding to the physical position and the physical orientation of the display device relative to the object.

11. The apparatus of claim 10, wherein in being configured to display the view of the volume in the model of the object corresponding to the physical position and the physical orientation of the display device to the object, the object manager is configured to display the view of the volume in the model of the object corresponding to the physical position and the physical orientation of the display device with a graphical indicator associated with the part when the part is in the view displayed on the display device.

12. A method for locating a part in an aircraft, the method comprising:

identifying the part in the aircraft;

generating a series of views from a model of the aircraft with graphical indicators in the series of views configured to provide guidance to a position of the part in the aircraft;

displaying the series of views on a display device;

displaying a view of a volume in the model of the aircraft corresponding to a physical position and a physical orientation of the display device with a graphical indicator indicating a direction to the position of the part when the part is absent from a view displayed on the display device; and creating the model as a visualization model from a computer-aided design model such that the visualization model includes only portions of the computer-aided design model needed to visualize the computer-aided design model, wherein a format of the information in the visualization model is selected to increase a speed at which a portion of the aircraft is displayed on the display device;

wherein metadata used to enable editing of the computer-aided design model is removed from the visualization model; and wherein the visualization model is stored in a data depot that is a storage system specific to a particular line for the aircraft.

13. The method of claim 12, wherein identifying the part comprises:

identifying the part from a part identifier for the part.

14. The method of claim 12, wherein identifying the part comprises:

identifying the part from coordinates for the part.

15. The method of claim 12, wherein a view in the series of views provides a more detailed view of the part in the aircraft than a prior view in the series of views.

16. The method of claim 12 further comprising:

identifying the physical position of the display device relative to the aircraft; and displaying the view of the volume in the model of the aircraft corresponding to the physical position of the display device relative to the aircraft.

17. The method of claim 16, wherein the step of identifying the physical position of the display device relative to the aircraft comprises:

identifying the physical position and the physical orientation of the display device relative to the aircraft, wherein the step of displaying the view of the volume in the model of the aircraft corresponding to the physical position of the display device relative to the aircraft comprises:

displaying the view of the volume in the model of the aircraft corresponding to the physical position and the physical orientation of the display device relative to the aircraft.

18. The method of claim 17, wherein displaying the view of the volume in the model of the aircraft corresponding to the physical position and the physical orientation of the display device to the aircraft comprises:

displaying the view of the volume in the model of the aircraft corresponding to the physical position and the physical orientation of the display device with a graphical indicator associated with a display of the part when the part is in the view displayed on the display device.

19. The method of claim 12, wherein the display device is selected from one of a tablet computer, a laptop computer, and a mobile phone.

20. An aircraft management system comprising:

a control system configured to control manufacturing of an aircraft; and an object manager in the control system, wherein the object manager is configured to identify a part in the aircraft;

generate a series of views from a model of the aircraft with graphical indicators in the series of views configured to provide guidance to a position of the part in the aircraft;

display the series of views on a display device; and display a view of a volume in the model of the aircraft corresponding to a physical position and a physical orientation of the display device with a graphical indicator indicating a direction to the position of the part when the part is absent from the view displayed on the display device;

wherein a visualization system creates the model as a visualization model from a computer-aided design model such that the visualization model includes only portions of the computer-aided design model needed to visualize the computer-aided design model;

wherein a format of the information in the visualization model is selected to increase a speed at which a portion of the aircraft is displayed on the display device;

wherein metadata used to enable editing of the computer-aided design model is removed from the visualization model; and wherein the visualization model is stored in a data depot that is a storage system specific to a particular line for the aircraft.

21. The aircraft management system of claim 20, wherein the aircraft management system is selected from at least one of a manufacturing system or an aircraft maintenance system.

22. The apparatus of claim 1, wherein the graphical indicator indicating the direction to the position of the part when the part is absent from the view displayed on the display device is an arrow indicating a direction to turn to see the part;

wherein the part is a seat;

wherein a computer-aided design system generated the computer-aided design model that is stored in a product data management system;

wherein the computer-aided design model includes information used to edit, and analyze the computer-aided design model;

wherein the computer-aided design model contains information to enable features for accessing and manipulating the computer-aided design model;

wherein the visualization data system is of a server that creates the visualization model from the computer-aided design model stored on the product data management system;

wherein the visualization model has less data than the computer-aided design model with information unnecessary to generate graphical representations of the part not included in the visualization model;

wherein the visualization data system removes information not needed to visualize objects in the computer-aided design model;

wherein data in the computer-aided design model is in a format that increases ease at which the part is designed, rather than how quickly the graphical representations of the part are generated and displayed; and wherein the series of views are generated from information in a data cache that is a copy of the visualization model stored on the data cache so that the display device never actually manipulates the visualization model.

\* \* \* \* \*